US009191525B2

(12) United States Patent
Sawayanagi et al.

(10) Patent No.: US 9,191,525 B2
(45) Date of Patent: Nov. 17, 2015

(54) IMAGE FORMING SYSTEM PERFORMING COMMUNICATION THROUGH VISIBLE LIGHT COMMUNICATION AND COMMUNICATION MODE DIFFERENT FROM VISIBLE LIGHT COMMUNICATION

(71) Applicant: Konica Minolta, Inc., Chiyoda-ku (JP)

(72) Inventors: Kazumi Sawayanagi, Itami (JP); Kenro Hama, Amagasaki (JP); Takeshi Morikawa, Takarazuka (JP); Daisuke Sakiyama, Kawanishi (JP); Yosuke Taniguchi, Tennoji-ku (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/170,682

(22) Filed: Feb. 3, 2014

(65) Prior Publication Data
US 2014/0218765 A1 Aug. 7, 2014

(30) Foreign Application Priority Data

Feb. 4, 2013 (JP) .................................. 2013-019139

(51) Int. Cl.
 H04N 1/00 (2006.01)
 H04B 10/116 (2013.01)
(52) U.S. Cl.
 CPC ......... *H04N 1/00111* (2013.01); *H04B 10/116* (2013.01)
(58) Field of Classification Search
 USPC .................. 358/474, 1.15, 1.9, 1.18, 1.13
 See application file for complete search history.

(56) References Cited

U.S. PATENT DOCUMENTS

| 7,359,070 B1* | 4/2008 | Smith ......................... 358/1.13 |
| 2007/0080827 A1* | 4/2007 | Huang ......................... 340/945 |
| 2007/0254694 A1 | 11/2007 | Nakagwa et al. |
| 2012/0072595 A1* | 3/2012 | St. Laurent et al. .......... 709/226 |

FOREIGN PATENT DOCUMENTS

| JP | 2005-218067 A | 8/2005 |
| JP | 2009-055481 A | 3/2009 |

(Continued)

OTHER PUBLICATIONS

Official Action (Notification of Reasons for Refusal) issued Jan. 20, 2015 in corresponding Japanese Patent Application No. 2013-019139, and English translation thereof (4 pages).

*Primary Examiner* — Jerome Grant, II
(74) *Attorney, Agent, or Firm* — Buchanan Ingersoll & Rooney PC

(57) ABSTRACT

An image forming system includes an image forming apparatus having a light emitter and an information terminal performing visible light communication and normal communication with the image forming apparatus. The image forming apparatus includes a visible light output unit outputting information stored in the image forming apparatus through visible light communication using the light emitter, and an output control unit controlling operation of the visible light output unit. The information terminal includes a light receiver, and an information acquisition unit acquiring visible light communication information based on information obtained by receiving visible light with the light receiver. The information acquisition unit gives a light emission communication start request to the output control unit through the normal communication with the image forming apparatus. When the light emission communication start request is received and the visible light output unit is stopping outputting information, the output control unit allows output of information.

33 Claims, 26 Drawing Sheets

(56) References Cited

FOREIGN PATENT DOCUMENTS

| JP | 2010-097390 A | 4/2010 | | |
| JP | 2011-028347 A | 2/2011 | | |
| WO | WO 03/093771 | * | 11/2003 | ............... G01D 9/00 |

* cited by examiner

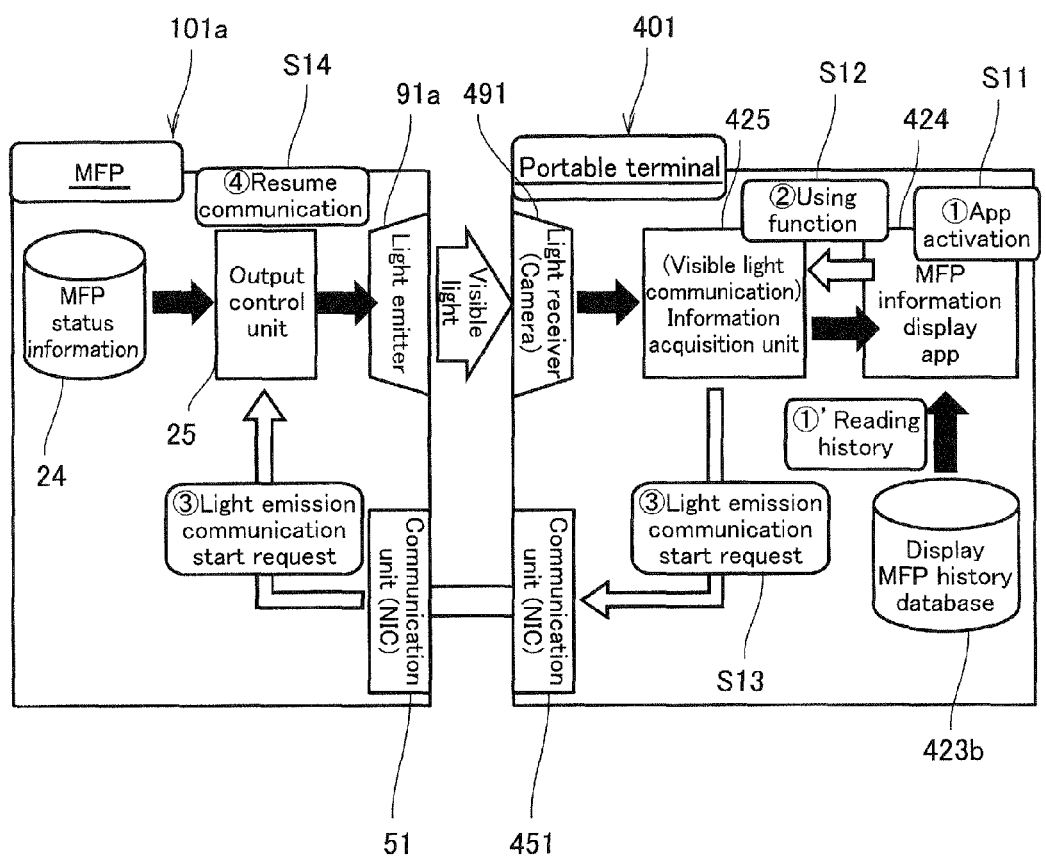

FIG.6

Communication Information

```
<UniqueInformation>
  <Identifier>MAC_ADDRESS</Identifier>
  <MachineType>C359</MachineType>
</UniqueInformation>
<Status>
  <Power>Idling</Power>
  <Feed Tray>
    <Tray1>A4,Full</Tray1>
    <Tray2>A4,Near Empty</Tray2>
    <Tray3>A3,Empty</Tray3>
  </FeedTray>
  <Job>
    <ActiveJob>3000,Tanaka,Printing</ActiveJob>
    <ActiveJob>3001,Yamada,Print Wait</ActiveJob>
  </Job>
  <PositionalInformation>
    <Device>C259,MAC,180°,3.2m</Device>
    <Device>C409,MAC,270°,8.0m</Device>
  </PositionalInformation>
</Status>
<OtherMFP>
</OtherMFP>
```

FIG.14

Communication Information

```
<UniqueInformation>
  <Identifier>MAC_ADDRESS</Identifier>
  <MachineType>C359</MachineType>
</UniqueInformation>
<Status>
  <Power>Idling</Power>
  <Feed Tray>
    <Tray1>A4,Full</Tray1>
    <Tray2>A4,Near Empty</Tray2>
    <Tray3>A3,Empty</Tray3>
  </FeedTray>
  <Job>
    <ActiveJob>3000,Tanaka,Printing</ActiveJob>
    <ActiveJob>3001,Yamada,Print Wait</ActiveJob>
  </Job>
  <PositionalInformation>
    <Device>C259,MAC,180°,8.0m</Device>
    <Device>C409,MAC,225°,2.0m</Device>
  </PositionalInformation>
</Status>
<OtherMFP>
  <Device>
    <RelativePosition>225°,2.0m</RelativePosition>
    <UniqueInformation>
      <Identifier>MAC_ADDRESS</Identifier>
      <MachineType>C359</MachineType>
    </UniqueInformation>
    <Status>
      <Power>Sleeping</Power>
      <Feed Tray>
        <Tray1>A4,Full</Tray1>
        <Tray2>A4,NearEmpty</Tray2>
        <Tray3>A3,Empty</Tray3>
      </FeedTray>
      <Job>
      </Job>
    </Status>
  </Device>
</OtherMFP>
```

FIG.22

Communication Information

```
<UniqueInformation>
   <Identifier>MAC_ADDRESS</Identifier>
   <MachineType>C359</MachineType>
</UniqueInformation>
<Status>
   <Power>Sleeping</Power>
   <InformationStoredlocation>
      <Device>http://192.168.1.40/c359/status</Device>
   </InformationStoredlocation>
</Status>
```

IMAGE FORMING SYSTEM PERFORMING COMMUNICATION THROUGH VISIBLE LIGHT COMMUNICATION AND COMMUNICATION MODE DIFFERENT FROM VISIBLE LIGHT COMMUNICATION

This application is based on Japanese Patent Application No. 2013-19139 filed with the Japan Patent Office on Feb. 4, 2013, the entire content of which is hereby incorporated by reference.

BACKGROUND OF THE INVENTION

1. Field of the Invention

The present invention relates to an image forming system, and more particularly to an image forming system using visible light communication.

2. Description of the Background Art

Image fixating apparatuses include MFPs (Multi-Functional Peripherals) having scanner, facsimile, copy, printer, data communication, and server functions, facsimile machines, copiers, and printers.

Visible light communication is sometimes used in communication between devices. Document 1 below discloses a configuration of a portable terminal with a camera capable of receiving visible light communication.

Document 2 below discloses an illumination system that performs communication between an illumination device and a terminal, in which power consumption of the terminal is reduced by determining whether a position of the terminal is within a communicable area.

Document 3 discloses an example of a network printing system in which a print request from a client terminal to an image forming apparatus can be processed properly even when a relative positional relationship between the image forming apparatus and the terminal outputting a print request to the image forming apparatus is changed.

[Document 1] Japanese Laid-Open Patent Publication No. 2005-218067
[Document 2] Japanese Laid-Open Patent Publication No. 2009-55481
[Document 3] Japanese Laid-Open Patent Publication No. 2011-28347

In recent years, the use of information terminals (for example, portable terminals including smart phones and tablet terminals) owned by users in workplace has developed as represented by adoption of the BYOD (Bring Your Own Device) policy. Augmented reality technology can be used as a solution to improve the convenience of image forming systems configured with such information terminals and image forming apparatuses installed in the same use environment. For example, the status information of the image forming apparatuses may be displayed as augmented reality associated with a camera image of the information terminal.

FIG. 26 is a screen view showing a usage example of an information terminal in an image forming system using augmented reality.

As shown in FIG. 26, in the image forming system as described above, image forming apparatuses 802, 803 and information 841a, 841b (in this case, also called air tags 841a, 841b) as augmented reality associated with image forming apparatuses 802, 803 are displayed together in an image (appearing on a display device 831 of an information terminal 801) captured by the camera of information terminal 801.

In the display involving augmented reality, air tags 841a, 841b on augmented reality may be associated with the actual positions of image forming apparatuses 802, 803, for example, by using positional information obtained by the GPS (Global Positioning System). For example, the positional information obtained by measuring the positions with the GPS and the positional information of image forming apparatuses 802, 803 obtained via an air tag server can be used. However, with such a method using the GPS, an error may be caused in position depending on the position recognition precision of the GPS. In particular, the error may be greater in the interior of a room. If the positional information to be used for association with air tags 841a, 841b has an error in this manner, air tags 841a, 841b fail to be displayed appropriately.

To address this problem, the display involving augmented reality may be provided by transmitting/receiving the positional information and the information of air tags 841a, 841b through visible light communication. To use visible light communication, an image of the light emitters such as LEDs (Light-Emitting Diode) provided in image forming apparatuses 802, 803 may be captured by the light receiver such as a camera of information terminal 801, and the captured image may be superimposed on air tags 841a, 841b obtained through visible light communication. In this case, when compared with the case where air tags 841a, 841b are displayed using the positional information obtained by measuring the positions with the GPS, the real objects can be accurately associated with air tags 841a, 841b on augmented reality and displayed on display device 831 of information terminal 801.

However, the display of air tags 841a, 841b using visible light communication as described above has some problems. Namely, when image forming apparatuses 802, 803 are in a low power mode, the light emitters of image forming apparatuses 802, 803 (light-emitting side) are turned off. As a result, information terminal 801 (light-receiving side) cannot receive information such as air tags 841a, 841b. Conversely, if information terminal 801 is set to be able to always receive information such as air tags 841a, 841b, it is necessary to keep the light emitters on even when image forming apparatuses 802, 803 operate in a low power mode, which consumes power accordingly.

The present invention is made to solve such problems. An object of the present invention is to provide an image forming system with low power consumption and with high convenience.

SUMMARY OF THE INVENTION

In order to solve the aforementioned object, according to an aspect of the present invention, an image forming system includes an image forming apparatus having a light emitter and an information terminal performing visible light communication and normal communication in a communication mode different from visible light communication with the image forming apparatus. The image forming apparatus includes a visible light output unit outputting information stored in the image forming apparatus through visible light communication using the light emitter, and an output control unit controlling operation of the visible light output unit. The information terminal includes a light receiver, and an information acquisition unit acquiring visible light communication information based on information obtained by receiving visible light with the light receiver. When the information acquisition unit is operative in the information terminal, the information acquisition unit gives a light emission communication start request to the output control unit by communicating with the image forming apparatus through the normal communication. When the light emission communication start request is received from the information acquisition unit and the visible light output unit is stopping output of information using the light emitter, the output control unit allows execution of output of information using the light emitter.

According to another aspect of the present invention, an image forming system includes an information processing apparatus and an image forming apparatus, each having a light emitter, and an information terminal capable of visible light communication with the information processing apparatus and the image forming apparatus. The information processing apparatus performs normal communication in a mode different from the visible light communication with each of the information terminal and the image forming apparatus. The image forming apparatus includes a device-to-device transmission unit transmitting device information about the image forming apparatus itself to the information processing apparatus through the normal communication. The information terminal includes a camera, an information acquisition unit acquiring visible light communication information from image information captured by the camera, a display unit performing display based on the visible light communication information acquired by the information acquisition unit, an azimuth sensing unit sensing an azimuth at which the information terminal faces, and a positional relationship transmission unit acquiring positional relationship information about a positional relationship between the information processing apparatus and the image forming apparatus using the azimuth sensing unit, if the information processing apparatus and the image forming apparatus are included in the image captured by the camera, and transmitting the positional relationship information or information based on the positional relationship information to at least the information processing apparatus. The information processing apparatus includes a position acquisition unit acquiring relative positional information between the information processing apparatus and the image forming apparatus, based on the information transmitted from the positional relationship transmission unit, and a visible light output unit outputting information to the information terminal through visible light communication using the light emitter. When the information terminal is capturing an image with the camera, the visible light output unit outputs the relative positional information acquired by the position acquisition unit and the device information transmitted from the image forming apparatus as the visible light communication information to the information terminal. The display unit determines whether the image forming apparatus is included in the image captured by the camera, based on the relative positional information output from the visible light output unit, and, if the image forming apparatus is included in the image, displays the device information based on the relative positional information.

According to a further aspect of the present invention, an image forming system includes an image forming apparatus having a light emitter, an information terminal capable of visible light communication with the image forming apparatus, and an information processing apparatus performing communication with each of the information terminal and the image forming apparatus. The image forming apparatus includes a device-to-device transmission unit transmitting device information about the image forming apparatus itself to the information processing apparatus through the normal communication in a communication mode different from visible light communication, and a visible light output unit acquiring information transmitted from the information processing apparatus and outputting the acquired information to the information terminal through visible light communication using the light emitter. The information processing apparatus includes a storage unit storing the device information transmitted by the device-to-device transmission unit, a provision unit providing the device information stored in the storage unit such that the information terminal can acquire the device information through the normal communication, and an access information transmission unit transmitting access information required for the information terminal to access the device information provided by the provision unit, to the image forming apparatus. The information terminal includes a light receiver, an information acquisition unit acquiring visible light communication information based on information obtained by receiving visible light with the light receiver, a device information acquisition unit accessing the device information in accordance with the access information to acquire the device information, when the access information output from the visible light output unit is acquired by the information acquisition unit, and a display unit performing display based on the device information acquired by the device information acquisition unit.

According to yet another aspect of the present invention, an information terminal performs visible light communication and normal communication in a communication mode different from visible light communication with an image forming apparatus having a light emitter. The information terminal includes a camera, an information acquisition unit acquiring visible light communication information from image information captured by the camera, a request transmission unit transmitting a light emission communication start request to the image forming apparatus by communicating with the image forming apparatus through the normal communication, when the information acquisition unit is operative in the information terminal, and an image capturing control unit capturing an image with the camera when the request transmission unit transmits the light emission communication start request.

According to still another aspect of the invention, an image forming apparatus has a light emitter and performs visible light communication and normal communication in a communication mode different from visible light communication with an information terminal. The image forming apparatus includes a visible light output unit outputting information stored in the image forming apparatus through visible light communication using the light emitter, a request receiving unit receiving a light emission communication start request from the information terminal, and an output control unit allowing the visible light output unit to execute output of information using the light emitter when the light emission communication start request is received by the request receiving unit and the visible light output unit is stopping output of information using the light emitter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing operation of the image forming system when the MFP is in a power saving mode in the first embodiment.

FIG. 6 is a diagram showing an example of visible light communication information output in the first embodiment.

FIG. 14 is a diagram showing an example of visible light communication information output in the second embodiment.

FIG. 22 is a diagram showing an example of visible light communication information output in the third embodiment.

DESCRIPTION OF THE PREFERRED EMBODIMENTS

Embodiments of the image forming system according to the present invention will now be described.

[Overview]

An image forming system includes an information terminal and an image forming apparatus.

The image forming device is a multi-function peripheral (MFP) provided with the scanner function, copying function, function as a printer, facsimile transmitting/receiving function, data communicating function, and server function. With the scanner function, the image forming device reads an image from a document which has been set, and stores the read image in a hard disk drive (HDD) or the like. With the copying function, the device further prints the image on a sheet of paper or the like. With the function as a printer, on receipt of a print instruction from an external terminal such as a personal computer (PC), the device prints an image on a sheet of paper on the basis of the instruction. With the facsimile transmitting/receiving function, the device receives facsimile data from an external facsimile machine or the like and stores the data in a HDD or the like. With the data communicating function, the device transmits data to or receives data from an external device connected thereto. With the server function, the device allows a plurality of users to share, e.g., data stored in a HDD or the like.

The information terminal is a portable terminal having a camera and a display as well as a variety of functions including, for example, a data communication function and an information storage/view/output function. The portable terminal is a multi-function mobile phone (called a smart phone) having a telephone function for making voice calls with another phone via a mobile telephone network. The portable terminal allows an image captured by the camera to be displayed on the display. The data communication function is a function for performing data communication with another device, for example, through a mobile phone network or any other networks. The data communication function can be performed, for example, through radio communication. The information storage/view/output function is a function that allows storage of information sent from the outside and information input by the user and allows the stored information to appear on the display or to be transmitted to an external device. The information terminal may be a tablet terminal or a laptop computer.

Figure 26:
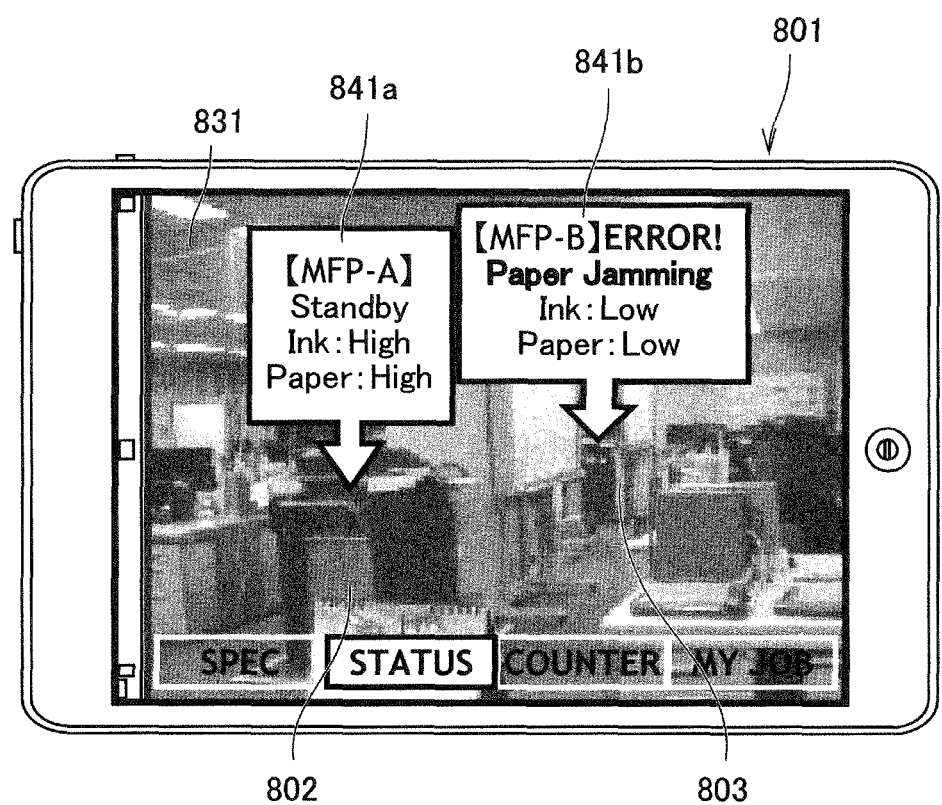
FIG. 26 is a screen view showing a usage example of an information terminal in an image forming system using augmented reality.

The image forming apparatus (hereinafter also referred to as MFP) and the portable terminal are connected to a network such as a LAN (Local Area Network) and can communicate with each other via the network. The MFP and the portable terminal are configured to be able to perform visible light communication, in which visible light emitted from the light emitter of the MFP is received by the light receiver such as a camera of the portable terminal, whereby information output from the light emitter is received. Accordingly, in the image forming system, augmented reality display (for example, the air tag display as shown in FIG. 26) can be performed. Specifically, for example, when a predetermined app (application software) is run on the portable terminal, the status information of the MFP is acquired from the MFP through visible light communication using the camera. The acquired information is overlaid on the image simultaneously captured by the camera.

Here, the MFP is configured to perform power saving control to automatically switch the operation mode to a power saving mode or a sleep mode when not being used and partially stop the operation of the apparatus. The image forming system is configured so as to be able to perform augmented reality display as described above even when the power saving control is performed in this way. The user's convenience is thus not reduced. This is implemented mainly through the following operations.

(1) For example, when the visible light communication function stops during the power saving mode of the MFP, the portable terminal activates a predetermined augmented reality display app to resume visible light communication between the portable terminal and the MFP.

Specifically, first, the MFP stops light emission from the light emitter when making a transition to the power saving mode in response to a particular condition (for example, the set time). In this state, the user activates an MFP information display app on the portable terminal, and then the app makes a request to use the information acquisition unit on the portable terminal. The information acquisition unit extracts only the MFP on the network at present from information about MFPs previously connected that is received via the app, and gives a light emission communication start request to the MAC address of the extracted MFP via the network. At the MFP having the MAC address to which the light emission communication start request is given, if a request received via the communication unit connecting to the network is a light emission communication start request, the output control unit is notified of the light emission communication start request. Receiving the light emission communication start request, the output control unit acquires the status information of the MFP itself and resumes output of the status information through visible light communication using the light emitter.

(2) For example, when there are two MFPs, one of the MFPs transmits its own status information to the other MFP in operation, at timing when it makes a transition to the power saving mode. The MFP receiving the information outputs the status information to the portable terminal through visible light communication together with the information of the MFP entering the power saving mode. Here, the relative positional information between the MFPs is collected in advance, and display is performed based on the relative positional information.

Specifically, first, the positional information of the two MFPs is acquired. For example, when the user activates an MFP information display app on the portable terminal, the app makes a request to use the information acquisition unit on the portable terminal. The information acquisition unit acquires the azimuth at which the portable terminal faces from direction (azimuth) sensing means. The information acquisition unit retrieves the MFP status information (MFP-A, MFP-B) received from the light receiver and displays the retrieved MFP status information on the portable terminal. Here, the MFP positional information (the azimuths and the relative distances of the two MFPs) is transmitted to each of the two MFPs whose information has been received. The transmitted MFP positional information (direction and relative distance) is stored into each MFP. Here, when one (MFP-B) of the MFPs makes a transition to the power saving mode in response to a particular condition (for example, the set time), the light emitter stops and the visible light communication function stops. The status information of MFP-B is transmitted to the other MFP (MFP-A) having the relative positional information, together with a transmission request for status information. The other MFP-A stores the received status information of MFP-B. When an app is activated on the portable terminal to perform augmented reality display in this state, the portable terminal acquires the status information of MFP-A as well as the status information of MFP-B that gives the light emission request to MFP-A through visible light communication using the light emitter of MFP-A. Accordingly, augmented reality display can be performed based on the status information of the two MFPs and the relative position of the MFP making a transition to the power saving mode to the MFP performing visible light communication.

(3) For example, when an MFP, an information storage server (server), and a portable terminal are connected to a network, the status information of the MFP may be stored in the server in advance, and the MFP may output information for accessing the information in the server through visible light communication, so that the light emission time for visible light communication is reduced, thereby achieving power saving.

Specifically, when the MFP makes a transition to the power saving mode in response to a particular condition (for example, the set time), the status information of the MFP is transmitted to the server and stored into the server. The MFP acquires URL information for accessing the status information stored in the server. The MFP outputs this URL information during visible light communication. When an MFP information display app is activated on the portable terminal in this state, the app makes a request to use the information acquisition unit on the portable terminal. The information acquisition unit retrieves the URL information from the information received by the light receiver and accesses the server to acquire the status information of the MFP. Accordingly, augmented reality display can be performed based on the status information of the MFP that is acquired from the server.

First Embodiment

Figure 1:
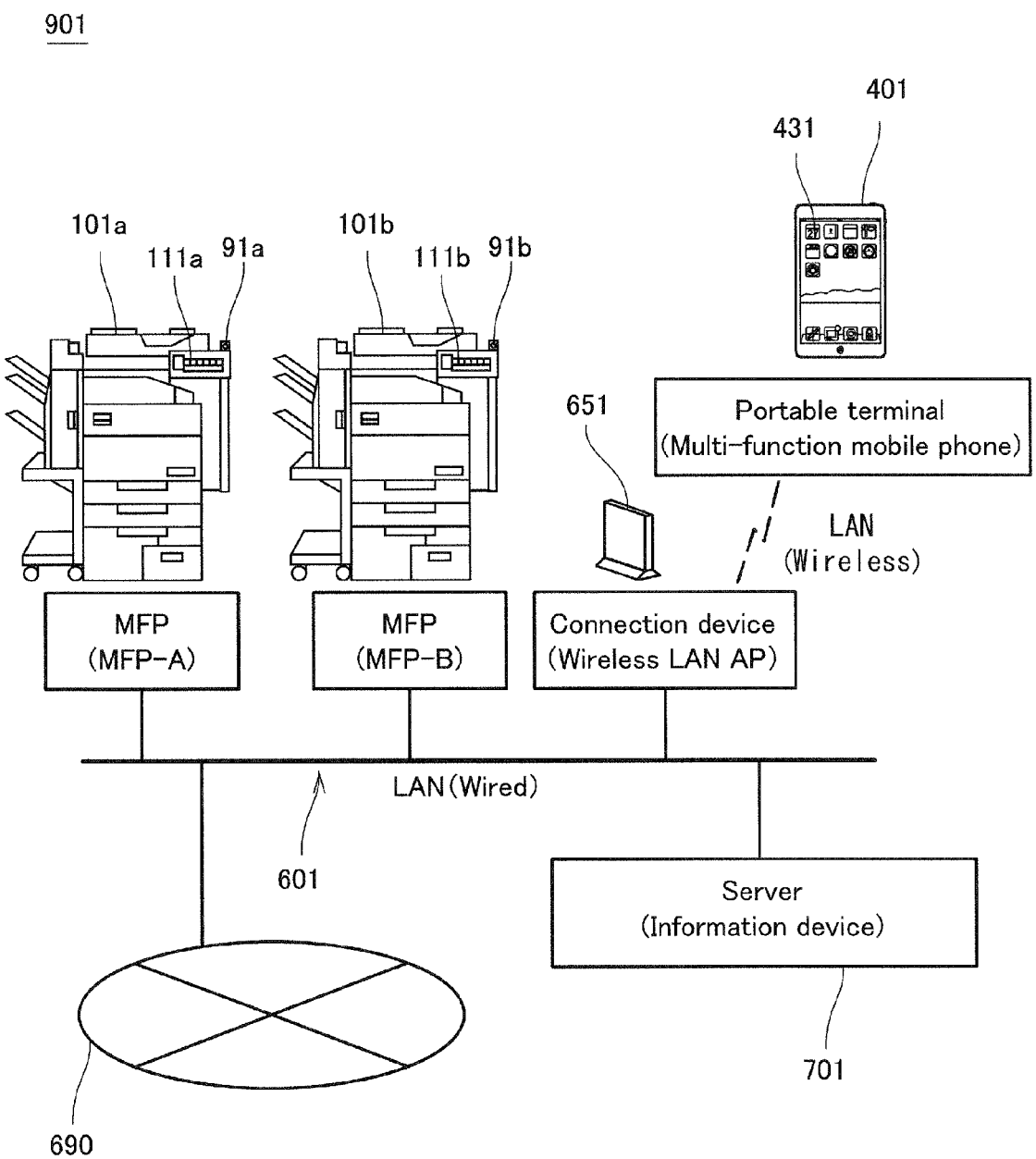
FIG. 1 is a block diagram showing an image forming system in a first embodiment of the present invention.

FIG. 1 is a block diagram showing an image forming system in a first embodiment of the present invention.

In the first embodiment, an image forming system 901 is configured to include two MFPs 101 (101a, 101b), a portable terminal 401, and a server (an example of an information processing apparatus) 701. The two MFPs 101 have generally the same configuration in the present embodiment and may be simply referred to as MFP 101 when they are described without being distinguished from each other. When the two MFPs are distinguished from each other, one of them may be referred to as MFP (MFP-A) 101a, and the other may be referred to as MFP (MFP-B) 101b.

As shown in FIG. 1, in image forming system 901, each MFP 101, portable terminal 401, and server 701 are connected such that they can communicate with each other through a network 601. Network 601 is, for example, a LAN (Local Area Network). Each MFP 101 and server 701 are connected to network 601 via a wired LAN. On the other hand, portable terminal 401 is connected to network 601 via a wireless LAN. That is, a connection device 651 serving as a wireless LAN access point is connected to network 601. Portable terminal 401 wirelessly connects to connection device 651 and connects to network 601 through connection device 651.

Network 601 is connected to an external network 690 such as the Internet. Hereinafter, network 601 and external network 690 may be collectively referred to as network 601 if distinction is not particularly required.

Server 701 has, for example, a function of storing information in image forming system 901 and providing information that can be accessed by any other devices.

Each of the two MFPs 101 also has functions as an information processing apparatus, including holding information, providing information to external devices, communicating with external devices, and transmitting/receiving information.

The connection mode of each device is not limited thereto. For example, each MFP 101 and portable terminal 401 may be connected so as to be able to establish device-to-device communication using near field communication technology or the like.

Here, in the first embodiment, MFPs 101a, 101b have light emitters 91a, 91b, respectively (also simply referred to as light emitter 91 without distinction). Each MFP 101 is configured to be able to output information to portable terminal 401 through visible light communication using light emitter 91. That is, each MFP 101 and portable terminal 400 can perform visible light communication and also perform communication through network 601 (an example of normal communication in a mode different from visible light communication).

[Configuration of Portable Terminal 401]

Figure 2:
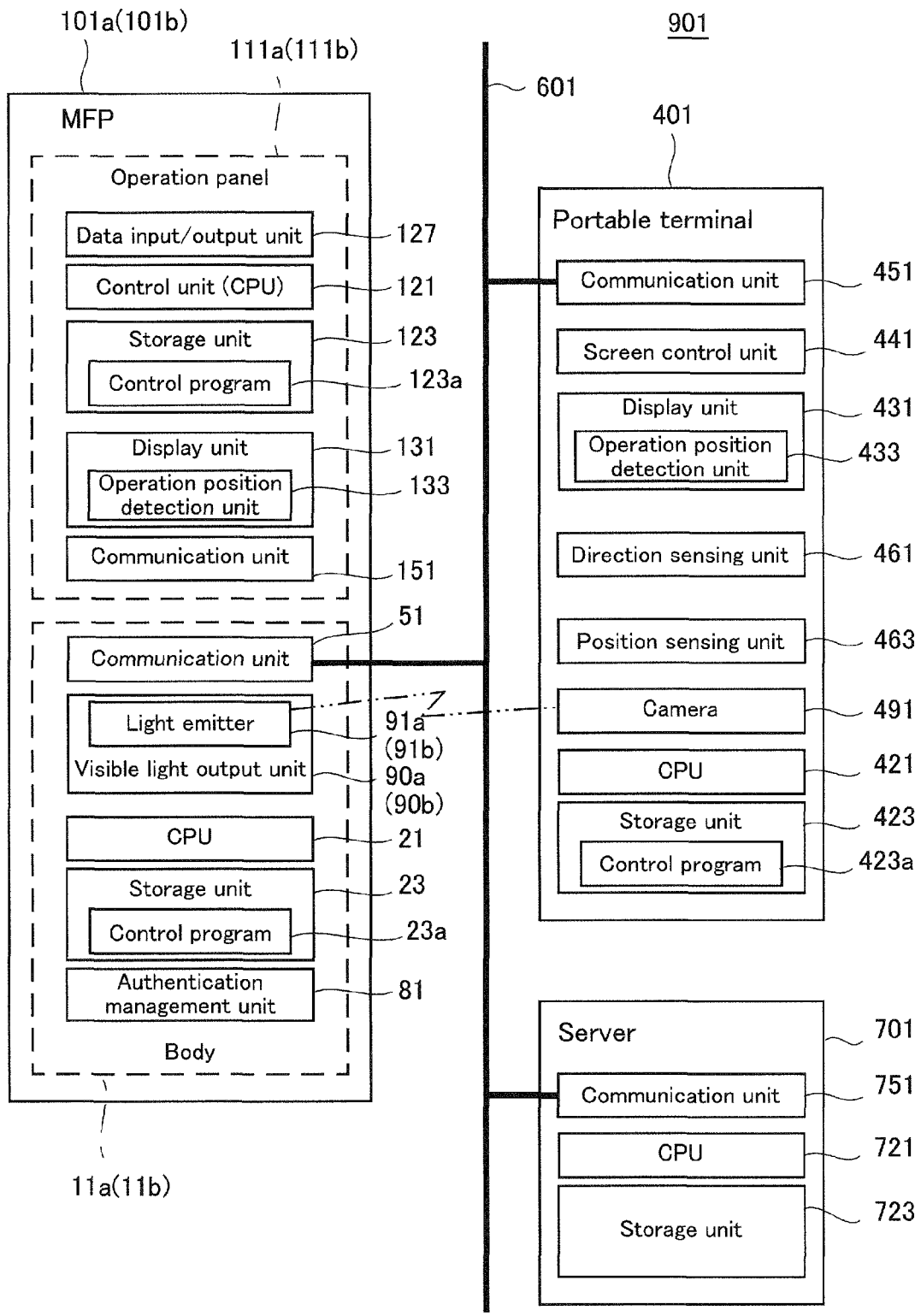
FIG. 2 is a block diagram showing the image forming system in the present embodiment.

FIG. 2 is a block diagram showing image forming system 901 in the present embodiment.

Portable terminal 401 is, for example, a multi-function mobile phone (smart phone). As shown in FIG. 2, portable terminal 401 mainly includes a CPU 421, a storage unit 423, a display unit 431, a screen control unit 441, and a communication unit 451. Portable terminal 401 can be easily grasped by the user.

CPU 421 controls operation of portable terminal 401 using storage unit 423 and any other units of portable terminal 401. Storage unit 423 is, for example, a memory such as a ROM and a RAM. A control program 423a to be executed in portable terminal 401 is stored in storage unit 423. CPU 421 executes control program 423a to perform control of operation of portable terminal 401 and communication with MFP 101 using communication unit 451. For example, a variety of apps can run on portable terminal 401 for transmission/reception of emails and schedule management.

Display unit 431 is a touch panel. Display unit 431 is an LCD (Liquid Crystal Display). Display unit 431 includes an operation position detection unit 433. Operation position detection unit 433 senses that the user touches display unit 431 and the contact position (user's operation position). Operation position detection unit 433 senses a barycenter position of an area touched by the user on display unit 431, as the user's operation position. When the user touches display unit 431, the information is sent to CPU 421, and CPU 421 controls portable terminal 401 based on the information. That is, the user can operate portable terminal 401 by touching display unit 431 and giving an operation.

Screen control unit 441 controls display on display unit 431. Screen control unit 441 displays, for example, a variety of guidance images and operation menu screens of portable terminal 401 on display unit 431.

Communication unit 451 performs radio communication with connection device 651 to connect portable terminal 401 to network 601. Accordingly, communication can be established between portable terminal 401 and MFP 101.

Here, in the first embodiment, portable terminal 401 is further provided with a direction sensing unit 461, a position sensing unit 463, and a camera 491.

Direction sensing unit 461 has, for example, a geomagnetic sensor and an acceleration sensor. Direction sensing unit 461 senses the orientation at which portable terminal 401 faces. Direction sensing unit 461 can sense an azimuth at which the portable terminal faces. Direction sensing unit 461 can sense an attitude of portable terminal 401.

Position sensing unit 463 has, for example, a GPS (Global Positioning System) sensor. That is, position sensing unit 463 can sense the position where portable terminal 401 is present.

Camera 491 is used, for example, to capture moving images and still images. Camera 491 is an example of the light receiver. CPU 421 allows an image captured by camera 491 to be displayed on display unit 431. Accordingly, the user can operate portable terminal 401 while viewing the image captured by camera 491.

[Configuration of Server 701]

Server 701 has a CPU 721, a storage unit 723, and a communication unit 751. Communication unit 751 connects server 701 to network 601. That is, communication unit 751 connects server 701 such that server 701 can communicate with MFP 101 and portable terminal 401 through network 601.

Storage unit 723 is, for example, a hard disk drive. In server 701, CPU 721 provides data stored in storage unit 723 such that it can be accessed from external devices. CPU 721 performs operations, for example, as a file server, an FTP (File Transfer Protocol) server, and an HTTP (Hypertext Transfer Protocol) server.

[Configuration of MFP 101]

Figure 3:
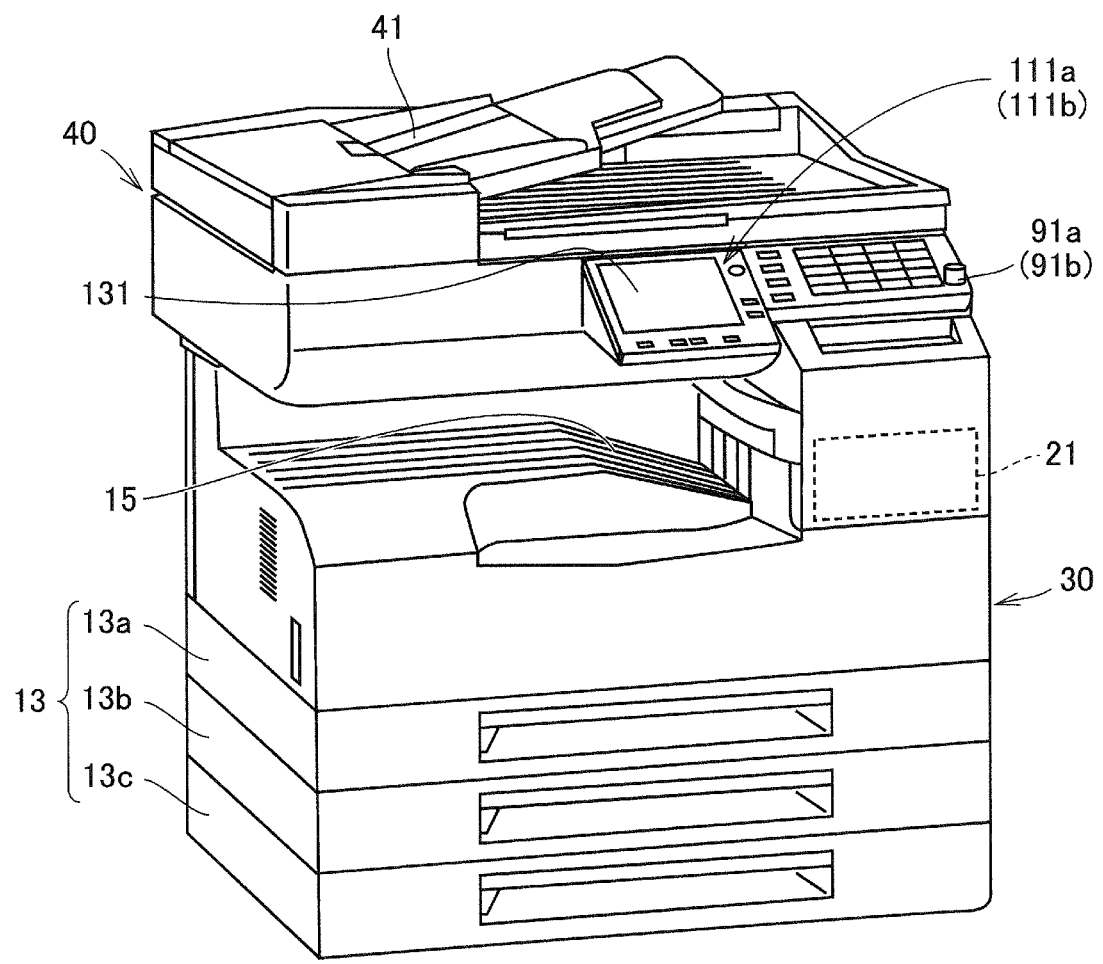
FIG. 3 is a perspective view of an MFP.
Figure 4:
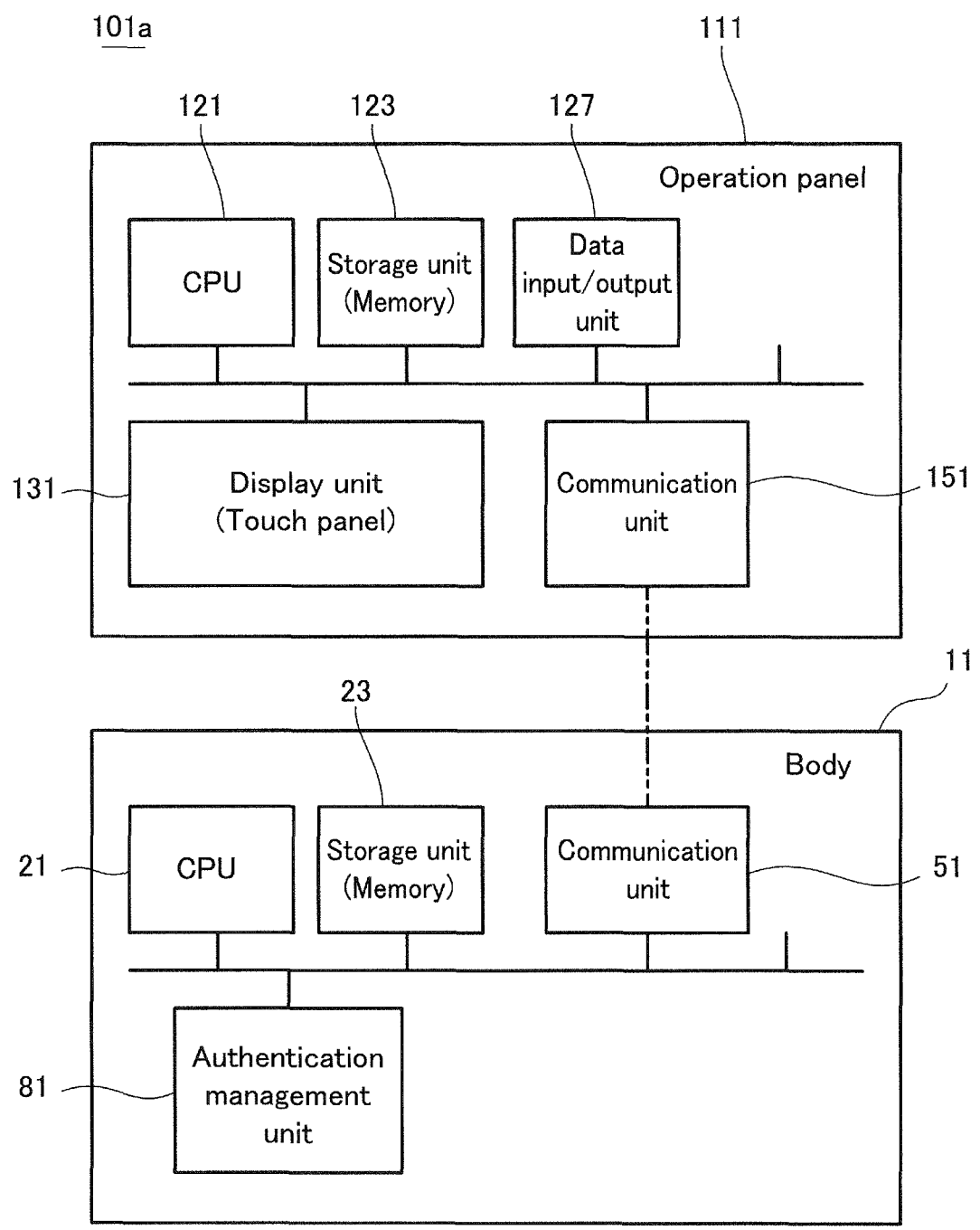
FIG. 4 is a block diagram showing a hardware configuration of the MFP.

FIG. 3 is a perspective view of MFP 101. FIG. 4 is a block diagram showing a hardware configuration of MFP 101.

As shown in FIG. 3, MFP 101 includes a paper-feed cassette 13, a paper output tray 15, a CPU 21, an image forming unit 30, an image scanner 40, and an operation panel 111. CPU 21 controls operation of MFP 101. CPU 21, image forming unit 30, and image scanner 40 are arranged in the inside of the casing of MFP 101.

This MFP 101 has three paper-feed cassettes 13 (paper-feed cassettes 13a, 13b, and 13c). For example, paper of different sizes (B5 size, A4 size, and A3 size, for example) is loaded in paper-feed cassettes 13. Paper-feed cassettes 13 are arranged in the lower portion of MFP 101 such that they can be inserted into/removed from the casing of MFP 101. Paper loaded in each paper-feed cassette 13 is fed sheet by sheet from paper-feed cassette 13 and sent to image forming unit 30 during printing. The number of paper-feed cassettes 13 is not limited to three and may be three or less or three or more.

Paper output tray 15 is arranged above the section accommodating image forming unit 30 and below the section accommodating image scanner 40 in the casing of MFP 101. Paper having an image formed thereon by image forming unit 30 is discharged to paper output tray 15 from the inside of the casing.

Image forming unit 30 mainly includes a toner image forming unit (not shown), a paper conveyance unit (not shown), and a fixing device (not shown). Image forming unit 30 forms an image on paper, for example, by electrophotography.

The paper conveyance unit is configured with paper feed rollers, conveyance rollers, and motors for driving them. The paper conveyance unit feeds paper from paper-feed cassette 13 and conveys paper inside the casing of MFP 101. The paper conveyance unit also discharges paper having an image formed thereon from the casing of MFP 101 to paper output tray 15.

The fixing device has a heating roller and a pressing roller. The fixing device conveys paper having a toner image formed thereon while sandwiching the paper between the heating roller and the pressing roller, and heats and presses the paper. The fixing device thus fuses toner adhered on the paper and fixes the toner on paper, thereby forming an image on paper.

Image scanner 40 is arranged in the upper portion of the casing of MFP 101. Image scanner 40 has an ADF (Auto Document Feeder) 41. Image scanner 40 performs the scanner function. Image scanner 40 scans a document placed on a transparent stage with a contact image sensor, and reads the scanned document as image data. Image scanner 40 also reads a plurality of sheets of a document set on a document tray with the contact image sensor while successively taking in the document sheet by sheet with ADF 41, and produces image data.

The image read by image scanner 40 is converted into a finished image by CPU 21. CPU 21 transmits the created finished image to an external device or forms an image on paper with image forming unit 30 based on the finished image. MFP 101 thus functions as an image scanner device.

Operation panel 111 is arranged on the front side (the front in FIG. 3) in the upper portion of MFP 101. Operation panel 111 has operation buttons that can be pressed by the user. Operation panel 111 also has a display unit 131 for displaying information to the user.

In the first embodiment, a light emitter 91 (91a, 91b) is arranged in proximity to operation panel 111 in the upper portion of MFP 101. Light emitter 91 has, for example, a light-emitting diode and is configured to emit visible light.

As shown in FIG. 4, in the present embodiment, MFP 101 is mainly divided into a device body (hereinafter also referred to as the body) 11 of MFP 101 and operation panel 111. Operation panel 111 is configured to be removed from body 11 and carried separately from body 11.

As shown in FIG. 2, body 11 includes, in addition to the above-noted units, a storage unit 23, a communication unit 51, an authentication management unit 81, and visible light output unit 90 (90a, 90b).

CPU 21 is connected to each unit of MFP 101 so as to be able to transmit/receive a signal. CPU 21 executes control program 23a stored in storage unit 23 to control a variety of operations of MFP 101.

In body 11, storage unit 23 is, for example, a ROM, a RAM, a flash memory, or an HDD. Storage unit 23 stores data of a print job sent from an external device connected to MFP 101, image data read by image scanner 40, and the like. Storage unit 23 also stores setting information of MFP 101 and control program 23a of MFP 101. CPU 21 reads control program 23a and executes control program 23a to execute a variety of control operations of MFP 101.

Communication unit 51 connects MFP 101 to network 601. This allows MFP 101 to communicate with a device such as portable terminal 401 connected to network 601.

Communication unit 51 can also wirelessly communicate with communication unit 151 of operation panel 111 as described later. This enables operations on MFP 101 through operation panel 111.

Authentication management unit 81 performs user authentication for MFP 101. User authentication is a job that identifies and authenticates a user who uses MFP 101. The user authenticated through the user authentication can log in to MFP 101 and use MFP 101. The user authentication will be detailed later.

Visible light output unit 90 has light emitter 91. Visible light output unit 90 is driven by CPU 21 executing control program 23a and performs visible light communication using light emitter 91. That is, visible light output unit 90 repeats turning on/off of light emitter 91 at high speed, under the control of CPU 21, and outputs information in MFP 101 as a signal of visible light communication.

Operation panel 111 has, in addition to display unit 131, a control unit (CPU) 121, a storage unit 123, a data input/output unit 127, and a communication unit 151.

Display unit 131 is a touch panel. Display unit 131 is, for example, an LCD (Liquid Crystal Display). Display unit 131 displays a guidance screen to the user and displays operation buttons for accepting a touch operation form the user. Display unit 131 has an operation position detection unit 133. Operation position detection unit 133 senses that the user touches display unit 131 and the contact position (user's operation position). Operation position detection unit 133 senses, for example, a barycenter position of an area touched by the user on display unit 131, as a user's operation position. When the user touches display unit 131, the information is sent to control unit 121, and control unit 121 controls operation panel 111 based on the information. That is, the user can operate operation panel 111 by touching display unit 131 and giving an operation.

Control unit 121 is configured, for example, with a CPU. Control unit 121 controls operation panel 111 and also controls display on display unit 131. Control unit 121 performs a process of acquiring an image to be displayed on display unit 131. That is, control unit 121 reads a display image prepared and stored in storage unit 123 in advance to display the read image on display unit 131 or generates a display image to display the generated image on display unit 131.

Storage unit 123 is, for example, a ROM, a RAM, or a flash memory. For example, control program 123a to be used for control of operation panel 111 and a variety of setting values are stored in storage unit 123. Control unit 121 reads control program 123a from storage unit 123 to control operation panel 111.

Data input/output unit 127 is, for example, a USB (Universal Serial Bus) interface or an interface for storage media such as memory cards under a variety of standards. An external device or an external storage medium can be connected to operation panel 111 through data input/output unit 127 so that data can be read from the external device or the like through operation panel 111. Connection to body 11 may be allowed through data input/output unit 127.

Communication unit 151 is configured to perform radio communication in a predetermined mode with communication unit 51 of body 11. Communication unit 151 can wirelessly communicate with communication unit 51 based on near field communication standards, for example, such as Bluetooth (registered trademark).

In the present embodiment, body 11 and operation panel 111 are connected with each other to be able to transmit/receive a signal since the respective communication units 51, 151 can wirelessly communicate with each other.

When, for example, display unit 131 is operated by the user, operation panel 111 transmits an operation signal or a predetermined command in accordance with the operation to CPU 21 of body 11 via communication units 51, 151. When an operation signal is sent from operation panel 111 or when an operation command is transmitted from an external device connected to MFP 101, CPU 21 executes predetermined control program 23a in response. A signal is sent from operation panel 111 to body 11 in accordance with the user's operation given on operation panel 111, whereby MFP 101 operates based on the user's operation. That is, the user can allow MFP 101 to perform a variety of operations by performing an operation on display unit 131 and the like.

The email transmission function may be mainly performed on the operation panel 111 side, that is, by CPU 121 executing control program 123a, or may be mainly performed on the body 11 side, that is, by CPU 21 executing control program 23a. This is applicable to any other processing that does not use image forming unit 30 and image scanner 40 of MFP 101.

Display unit 131 is also used as an information display. For example, when information about a status of MFP 101 is sent from body 11 to operation panel 111, operation panel 111 makes display on display unit 131 based on that information. Accordingly, the user can be notified of information about MFP 101.

[Operation of Image Forming System 901]

Here, in the first embodiment, portable terminal 401 can capture an image of MFP 101a or MFP 101b with camera 491 to acquire information about the captured MFP 101a, 101b through visible light communication. Here, for example, information such as an operating state of MFP 101, a toner level, or a remaining paper level can be transmitted as status information from MFP 101 to portable terminal 401. Portable terminal 401 can display the acquired information on display unit 431 of portable terminal 401. Here, at portable terminal 401, if MFP 101 is included in the image captured by camera 491, the acquired status information can be overlaid as an air tag adjacent to MFP 101 (air tag display; augmented reality display) under the control of CPU 421. Accordingly, the user can know status information for MFP 101 easily and intuitively by capturing an image of MFP 101 using portable terminal 401.

For example, when MFP 101 is not used for a predetermined period of time, the operation mode is changed to a power saving mode such as a sleep mode. The power saving mode is an operation mode in which operation of some parts (for example, image forming unit 30 and image scanner 40) of MFP 101 is stopped.

In image forming system 901, when MFP 101 makes a transition to the power saving mode in this manner, visible light communication is performed between MFP 101 and portable terminal 401 in a manner described below. This ensures that portable terminal 401 executes air tag display for MFP 101 even when MFP 101 is in the power saving mode. Therefore, the convenience of image forming system 901 using portable terminal 401 can be enhanced while power consumption of MFP 101 is reduced.

Operation During MFP Power Saving Mode
Transition in First Embodiment

In the first embodiment, when MFP 101 makes a transition to the power saving mode, acceptance of a light emission communication start request from portable terminal 401 is enabled. Accordingly, when an image is captured by portable terminal 401, visible light communication can be performed even during operation in the power saving mode. Such operation will be described below.

FIG. 5 is a block diagram showing operation of image forming system 901 when MFP 101*a* is in the power saving mode in the first embodiment.

Here, of two MFPs 101, the operation of MFP 101*a* in the power saving mode will be described. For the sake of brevity, MFP 101*b* and server 701 will not be mentioned.

As shown in FIG. 5, in portable terminal 401, visible light communication and augmented reality display are performed under the control of an information acquisition unit 425. Information acquisition unit 425 is a functional block that is allowed to function by CPU 421 executing predetermine control program 423*a*.

MFP 101*a* performs visible light communication under the control of an output control unit 25. Output control unit 25 controls visible light output unit 90*a* (shown in FIG. 2) and outputs information in MFP 101*a* using light emitter 91*a*. Output control unit 25 is allowed to function by CPU 21 executing control program 23*a*.

To perform augmented reality display, the user operates portable terminal 401 and activates a predetermined app (MFP information display app) 424 (S11). When app 424 is activated, app 424 reads a display MFP history database (hereinafter also referred to as history database) 423*b*. History database 423*b* is stored, for example, in storage unit 423. History database 423*b* stores, for example, MFPs 101 to which a light emission communication start request has been given before. In the present embodiment, for example, of MFPs 101 to which a light emission communication start request has been given before, the one that has actually performed visible light communication with portable terminal 401 is registered, although not being limited thereto. As information of MFPs 101, their MAC addresses may be registered in history database 423*b*.

Next, app 424 makes a request to use the function of information acquisition unit 425 (S12). Here, MFP 101*a* is in operation in the power saving mode, and visible light output unit 90*a* does not allow light emitter 91*a* to emit light. In this case, information acquisition unit 425 transmits a light emission communication start request to MFP 101*a* (S13). Light emission communication start request S13 is sent to output control unit 25 via network 601 through communication unit 451 and communication unit 51 of MFP 101*a*.

Receiving the light emission communication start request, output control unit 25 resumes visible light communication with visible light output unit 90*a* (S14). That is, output control unit 25 reads the status information of MFP 101*a*. Output control unit 25 then allows visible light output unit 90*a* to emit light from light emitter 91*a* thereby to output the read status information as visible light communication information.

When visible light communication information is output in this manner, that is, when light emitter 91*a* emits light, portable terminal 401 kept such that light emitter 91*a* falls within the angle of view receives visible light from light emitter 91*a* with camera 491. Information acquisition unit 425 acquires visible light communication information based on the received light result from camera 491. App 424 displays a screen based on the status information included in the acquired visible light communication information. Augmented reality display is thus realized.

FIG. 6 is a diagram showing an example of visible light communication information output in the first embodiment.

As shown in FIG. 6, in image forming system 901, for example, the visible light communication information is output as a document in the XML (Extensible Markup Language) format. That is, the visible light communication information mainly includes unique information of MFP 101*a* that creates the visible light communication, status information of MFP 101*a*, and information about the other MFP 101 that is simultaneously output. Here, the status information and the information about the other MFP 101 may be empty. In the example shown in FIG. 6, the information about the other MFP 101 is empty.

The unique information includes, for example, a sign indicating the model of MFP 101*a* and the MAC address. The MAC address is also used as an identifier that can identify MFP 101*a* among the devices included in image forming system 901.

The status information includes, for example, information about an operating state (for example, during idling, during job execution, or during operation in the power saving mode), information about the size and quantity of paper stored in each of paper trays 13*a*, 13*b*, 13*c*, information about a job held by MFP 101*a* at present, and positional information. Among those, the information about the operating state and paper is included as an air tag in augmented reality display. The positional information, though not being used as an air tag, may be included in the status information as described above or may not be included.

Figure 7:
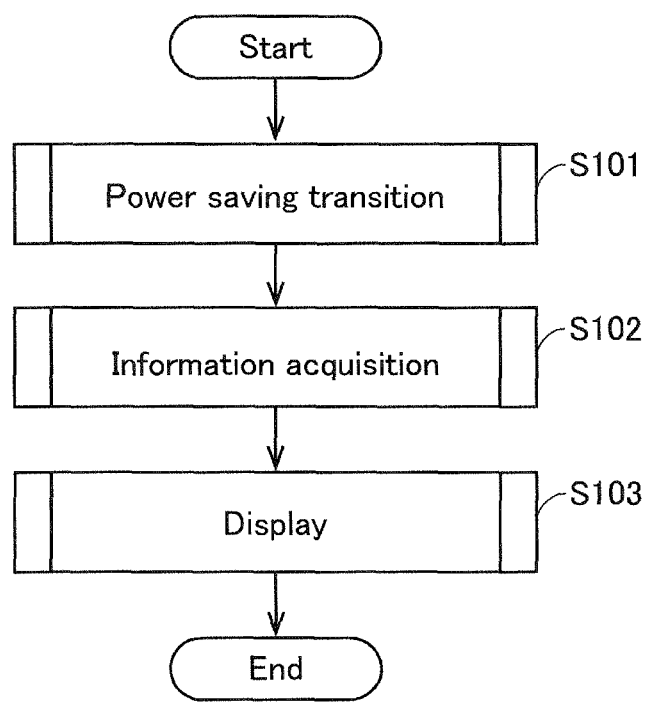
FIG. 7 is a flowchart showing an example of operation of the image forming system that is performed in the first embodiment.

FIG. 7 is a flowchart showing an example of operation of image forming system 901 that is performed in the first embodiment.

The operation described above will be explained using flowcharts and timing charts. Referring to FIG. 7, in the first embodiment, the operation from when MFP 101*a* enters the power saving mode to when augmented reality display is performed mainly includes three phases from step S101 to step S103, namely, a power saving transition phase (S101), an information acquisition phase (S102), and a display phase (S103).

Figure 8:
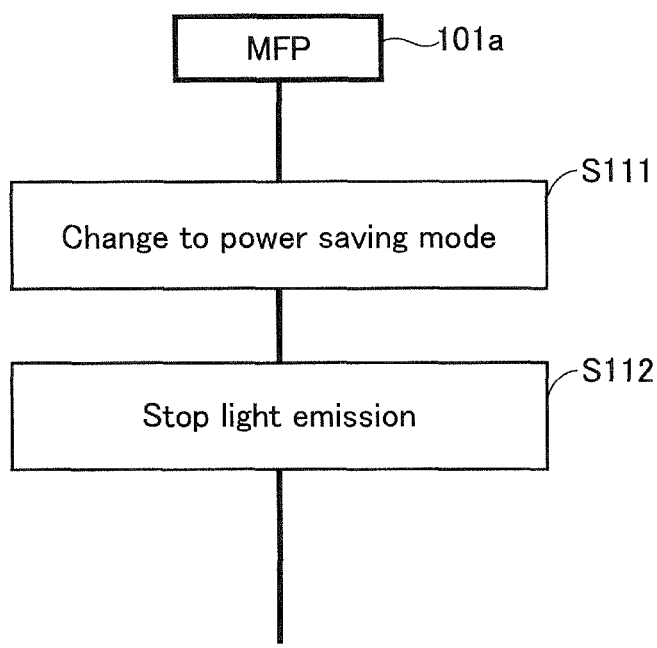
FIG. 8 is a diagram showing operation of a power saving transition phase.

FIG. 8 is a diagram showing operation of the power saving transition phase.

As shown in FIG. 8, in the power saving transition phase, operation is performed in MFP 101. In step S111, for example, when a predetermined condition is satisfied during operation of MFP 101 in the normal operation mode, CPU 21 changes the operation mode of MFP 101 to the power saving mode. Here, a predetermined condition is, for example, whether a predetermined period has passed with no operation on MFP 101, or whether a predetermined time has come.

When the operation mode of MFP 101 changes to the power saving mode, light emission from light emitter 91a is stopped, in step S112. That is, output control unit 25 stops visible light communication by visible light output unit 90a.

Figure 9:
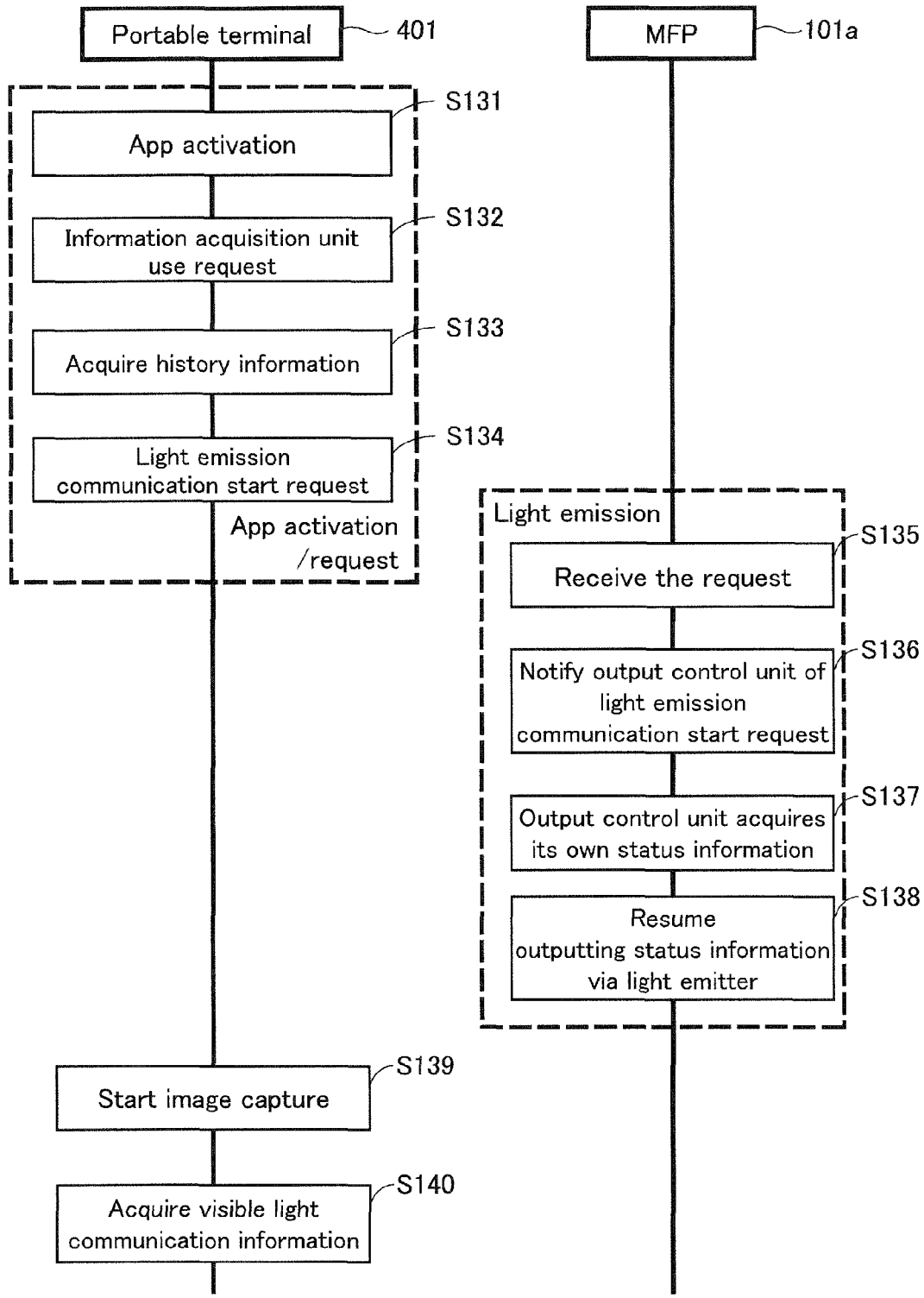
FIG. 9 is a diagram showing operation of an information acquisition phase.

FIG. 9 is a diagram showing operation of the information acquisition phase.

As shown in FIG. 9, in the information acquisition phase, operation is performed between portable terminal 401 and MFP 101a. First, processing from step S131 to step S134 is performed at portable terminal 401 (app activation/request operation). Thereafter, processing from step S135 to step S138 is performed at MFP 101a (light emission operation).

In step S131, when app 424 is activated in portable terminal 401, the app activation/request operation is started.

In step S132, app 424 makes an information acquisition unit use request to use information acquisition unit 425.

In step S133, app 424 acquires history information from history database 423b.

In step S134, information acquisition unit 425 makes a light emission communication start request. The light emission communication request is sent to MFP 101a.

Here, in the present embodiment, a next light emission communication start request is transmitted only to the MFP that performed visible light communication in the past, based on the history information. This prevents transmission/reception of unnecessary information.

The light emission communication request allows a light emission operation to be performed in MFP 101a. First, in step S135, communication unit 51 receives the light emission communication start request from portable terminal 401.

In step S136, communication unit 51 notifies output control unit 25 of the light emission communication start request. Output control unit 25 receives the light emission communication start request.

In step S137, output control unit 25 acquires its own status information, that is, the status information of MFP 101a as data to be output from MFP 101a.

In step S138, output control unit 25 controls visible light output unit 90a to resume visible light communication. Visible light output unit 90a allows light emitter 91a to emit light under the control of output control unit 25 and outputs visible light communication information including the status information.

In addition to this light emission operation, in step S139, image capturing using camera 491 is started in portable terminal 401. The image capturing is performed, for example, under the control of CPU 421 that controls app 424. When light emitter 91a of MFP 101a falls within the angle of view of the lens of camera 491, camera 491 captures an image, and camera 491 also receives a signal of visible light communication emitted from light emitter 91a. The information obtained from the received light is processed by information acquisition unit 425.

In step S140, information acquisition unit 425 acquires visible light communication information based on the information obtained by camera 491 receiving light from light emitter 91a. The operation in the information acquisition phase thus ends.

Figure 10:
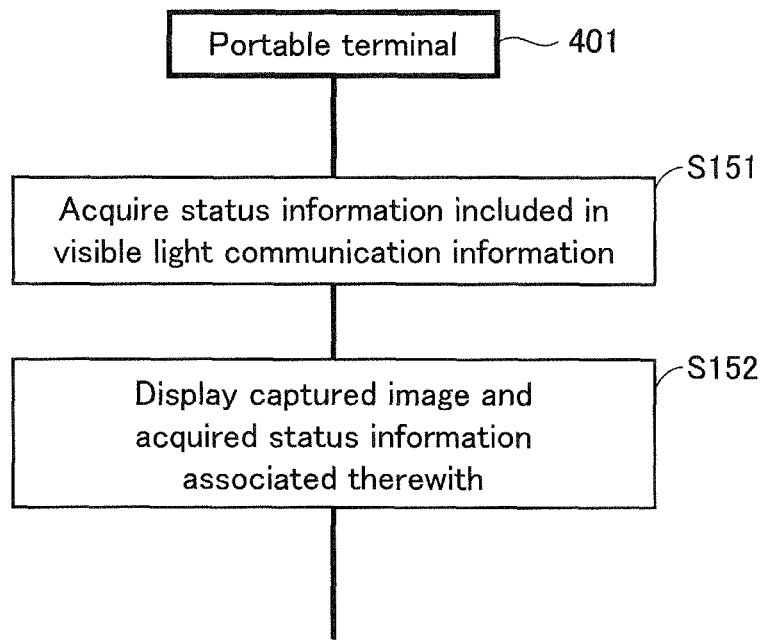
FIG. 10 is a diagram showing operation of a display phase.

FIG. 10 is a diagram showing operation of the display phase.

As shown in FIG. 10, in the display phase, operation is performed in portable terminal 401. In step S151, app 424 acquires the status information of MFP 101a that is included in the visible light communication information acquired by information acquisition unit 425.

In step S152, app 424 displays an image captured by camera 491 and the acquired status information associated therewith on display unit 431. For example, when the image captured by camera 491 is displayed on display unit 431 functioning as a monitor of camera 491, the position of MFP 101a included in the image is identified by app 424. App 424 then overlays the status information like a tag adjacent to the identified position. Augmented reality display is thus performed.

In the first embodiment in which augmented reality display is performed as described above, augmented reality display can be readily performed at portable terminal 401 to display the status information of MFP 101a even when MFP 101a is operating in the power saving mode. Therefore, image forming system 901 with reduced power consumption of MFP 101 and with high convenience can be provided.

The light emission communication start request may not be transmitted based on history information. For example, the light emission communication start request may be broadcasted to devices connected to network 601. This eliminates the need for managing history database 423b at portable terminal 401 and can reduce the volume of data processed by portable terminal 401.

The light emission communication start request may be transmitted only to the MFP 101 that is concerned with the user. For example, MFP 101 that has been allowed to execute a job may be identified (may be identified automatically by app 424 of portable terminal 401 or may be identified by asking the user to make a choice), and the light emission communication start request may be sent to the identified MFP 101.

The light emission communication start request may be always transmitted from portable terminal 401 when app 424 is activated, irrespective of an operating state of MFP 101, or may be transmitted depending on an operating state of MFP 101. In the latter case, the light emission communication start request may be transmitted when MFP 101 is in operation in the power saving mode, or may be transmitted when it is identified that light emitter 91 of MFP 101 is not emitting light.

The timing for transmitting the light emission communication start request may be when app 424 is activated, or when a predetermined time has passed after app 424 is activated.

In the first embodiment, visible light communication may not be performed with camera 491. For example, portable terminal 401 may be provided with a light receiver different from camera 491, and status information may be obtained based on the information received by the light receiver.

Second Embodiment

The basic configuration of image forming system 901 in a second embodiment is the same as that of the first embodiment, and a description thereof is therefore not repeated here. The operation of augmented reality display using portable terminal 401 when MFP 101 is in the normal operation mode is also the same as in the first embodiment.

Operation During MFP Power Saving Mode Transition in Second Embodiment

In the second embodiment, when, of two MFPs 101a, 101b, for example, MFP 101b makes a transition to the power saving mode, the status information of MFP 101b can be output through visible light communication through MFP 101a. Accordingly, when an image is captured by portable terminal 401, the status information of both of two MFPs 101a, 101b can be displayed on portable terminal 401 even though MFP 101b is in operation in the power saving mode. Here, the relative position of MFP 101b to MFP 101a is measured in advance and stored into MFP 101a. Therefore, when augmented reality display is performed, the status information of each MFP 101a, 101b can be displayed as an air tag for the corresponding device. This operation will be described below.

The operation described below is concerned with two MFPs 101a, 101b and portable terminal 401. For the sake of brevity, server 701 and the like will not be mentioned.

In the second embodiment, a positional information acquisition operation is performed in advance in a state before MFP 101b makes a transition to the power saving mode. A first operation is a process for specifying the relative position between MFPs 101a and 101b. The first operation may be performed periodically when augmented reality display is performed by portable terminal 401 or may be performed only once, for example, when MFPs 101a, 101b are installed.

Figure 11:
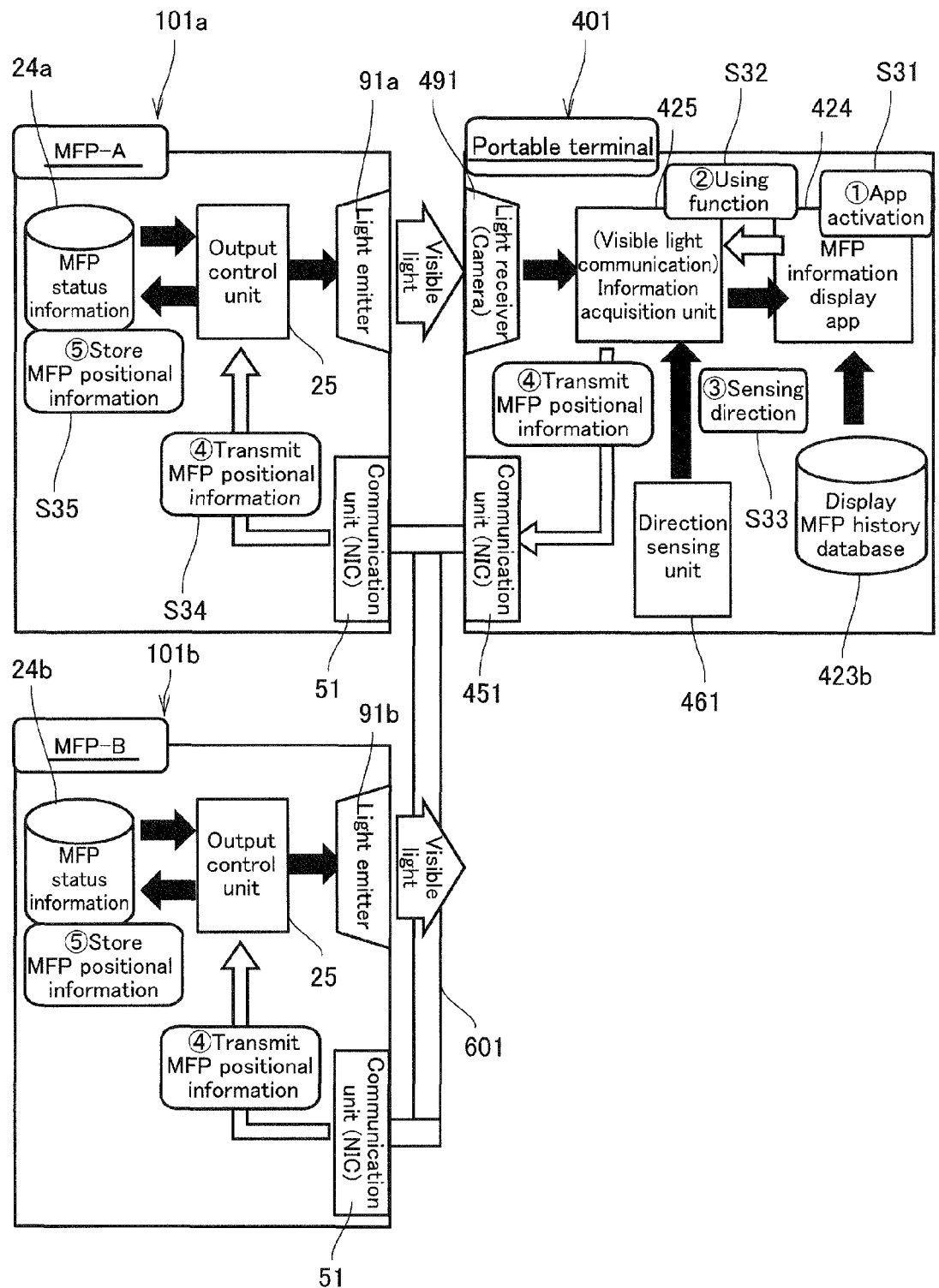
FIG. 11 is a block diagram illustrating a positional information acquisition operation of the image forming system that is performed in a second embodiment.

FIG. 11 is a block diagram illustrating the positional information acquisition operation of image forming system 901 that is performed in the second embodiment.

In the positional information acquisition operation, first, the user activates a predetermined app 424 on portable terminal 401 (S31). This allows app 424 to run under the control of CPU 421. When app 424 is activated, app 424 reads history database 423b. The reading of history database 423b may not be executed.

App 424 then makes a request to use the function of information acquisition unit 425 (S32). Information acquisition unit 425 acquires information about the azimuth of portable terminal 401 from direction sensing unit 461 (S33). That is, information acquisition unit 425 senses the direction of portable terminal 401.

Visible light communication information including status information is sent through visible light communication from each of light emitter 91a of MFP 101a and light emitter 91b of MFP 101b. When app 424 is activated, camera 491 receives light from each light emitter 91. Information acquisition unit 425 acquires status information of each MFP 101 from the information obtained by receiving light with camera 491. App 424 performs augmented reality display based on the acquired status information and information captured by camera 491. The position of each MFP 101 can be determined, for example, based on the position of light emitter 91. In other words, the position at which the air tag of status information is to be displayed can be specified based on the position of light emitter 91 of each MFP 101.

Here, in a case where two MFPs 101 fall within the angle of view in a plane captured by camera 491, when visible light emitted from each light emitter 91 for visible light communication is received, information acquisition unit 425 acquires information about the direction of portable terminal 401 at that time and the distance to light emitter 91. The distance to light emitter 91 can be measured, for example, when visible light communication is performed. The information obtained here serves as positional relationship information related to the positional relationship between MFP 101a and MFP 101b together with the unique information indicating each MFP 101. In other words, the positional relationship information includes the azimuth information obtained by direction sensing unit 461 of portable terminal 401, the distance information obtained by calculating the distance from portable terminal 401 capturing an image to each of two MFPs 101a, 101b, and the unique information (for example, MAC address) of MFPs 101a, 101b obtained from visible light output units 90 of MFPs 101a, 101b.

App 424 transmits the positional relationship information to each of MFPs 101a, 101b from which the status information is received, through information acquisition unit 425 (S34). The positional relationship information is transmitted through network 601 via communication unit 451. Each MFP 101 receives the positional relationship information at communication unit 51. The received positional relationship information is sent to output control unit 25.

When the positional relationship information is sent to output control unit 25, CPU 21 calculates the relative positional information based on the obtained positional relationship information. As the relative positional information, the relative distance and azimuth between MFPs 101 are calculated by triangulation based on the positional relationship information. For example, MFP 101a calculates the relative distance of MFP 101b to MFP 101a and the azimuth at which MFP 101b is located. Upon calculation of the relative positional information, output control unit 25 stores the relative positional information into storage unit 23.

Figure 12:
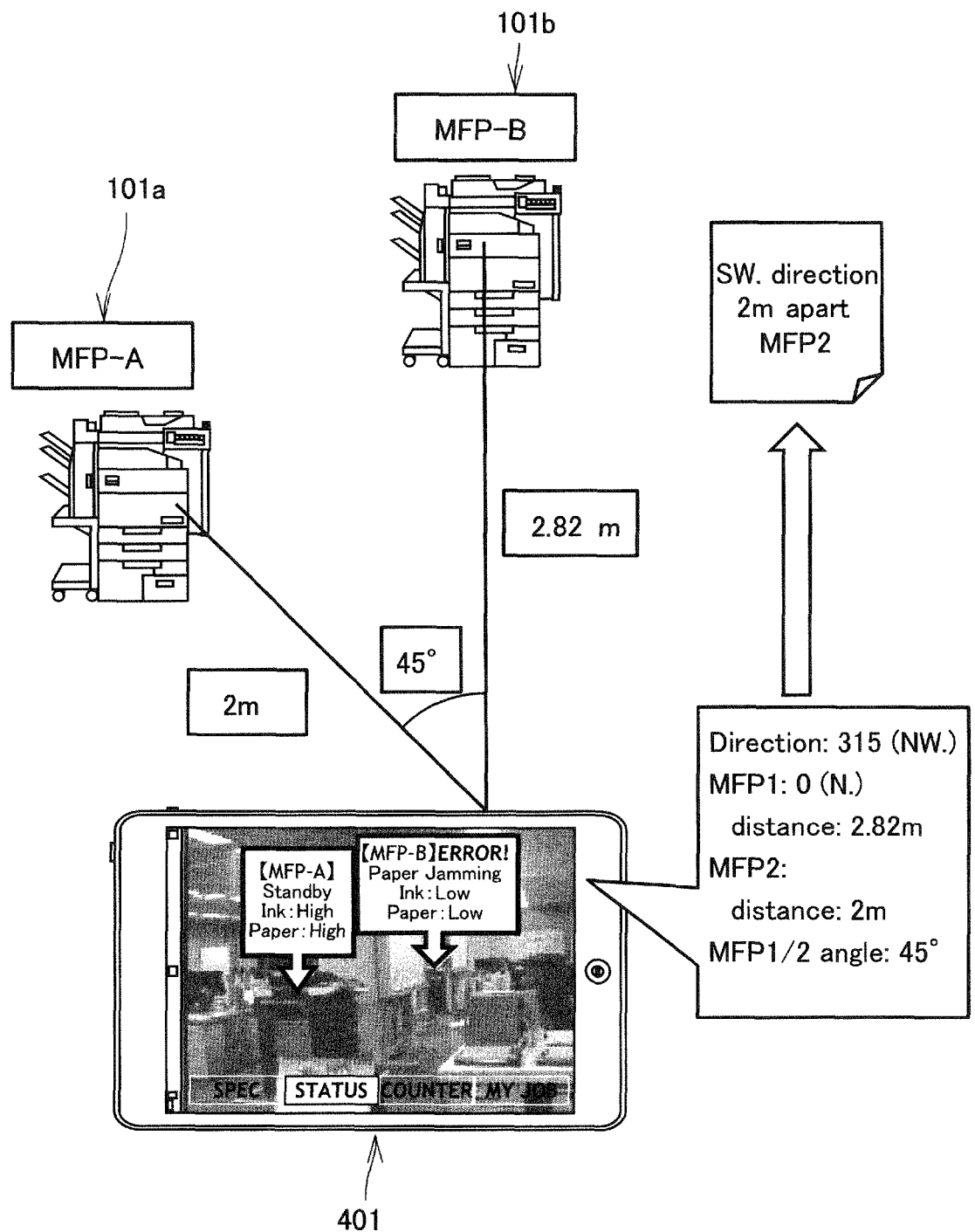
FIG. 12 is a diagram showing calculation of relative positional information.

FIG. 12 is a diagram showing calculation of the relative positional information.

As shown in FIG. 12, it is assumed that app 424 is activated at portable terminal 401 and the status information of MFP 101a and MFP 101b is acquired through visible light communication. For example, in the example shown in FIG. 12, information that MFP 101a is located to the northwest from portable terminal 401 and the distance from portable terminal 401 to MFP 101a is 2 meters (azimuth information and first distance information) is obtained. Information that MFP 101b is located to the north from portable terminal 401 and the distance from portable terminal 401 to MFP 101b is 2.82 meters (azimuth information and second distance information) is also obtained. Both information are sent as positional relationship information to MFP 101a together with the unique information of each MFP 101.

MFP 101a can calculate the relative distance of MFP 101b to MFP 101a and the azimuth at which MFP 101b is located as viewed from MFP 101a, based on such positional relationship information. Likewise, MFP 101b can calculate the relative distance of MFP 101a to MFP 101b and the azimuth at which MFP 101a is located as viewed from MFP 101b, based on such positional relationship information. In the example shown in FIG. 12, MFP 101b can sense that MFP 101a is present at a position two meters away in the southwest direction. Likewise, MFP 101a can sense that MFP 101b is present two meters away in the northeast direction.

When either MFP 101 makes a transition to the power saving mode after the positional information acquisition operation is performed as described above, augmented reality display can be performed in image forming system 901 using portable terminal 401 as follows. In the example described below, MFP 101b makes a transition to the power saving mode. In the second embodiment, however, when MFP 101a makes a transition to the power saving mode, augmented reality display is also performed in the same manner with the roles of MFP 101a and 101b being switched.

Figure 13:
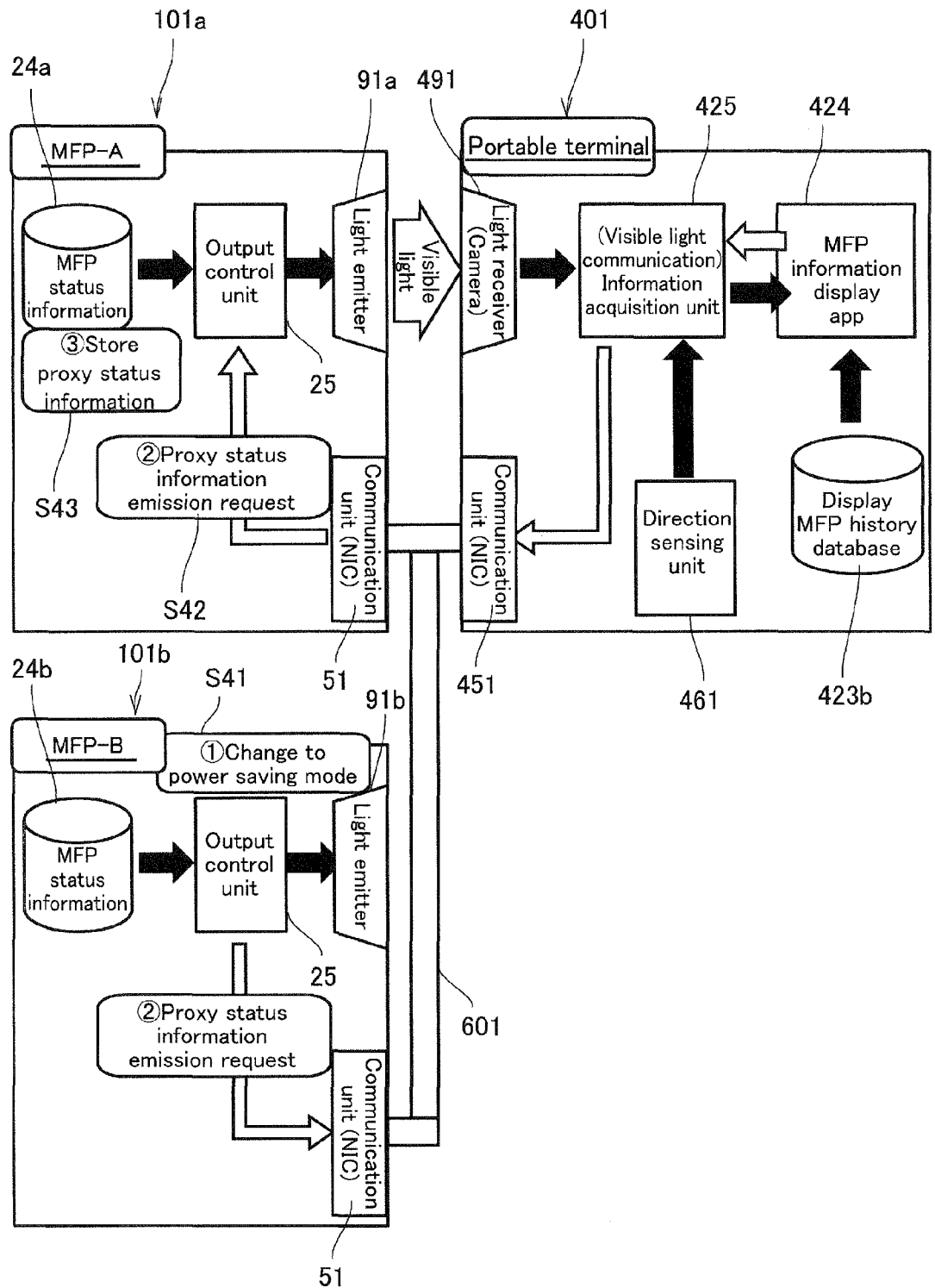
FIG. 13 is a block diagram illustrating operation of the image forming system when the MFP makes a transition to the power saving mode in the second embodiment.

FIG. 13 is a block diagram illustrating operation of image forming system 901 when MFP 101b makes a transition to the power saving mode in the second embodiment.

As shown in FIG. 13, the operation mode of MFP 101b changes to the power saving mode (S41). Output control unit 25 of MFP 101b then transmits the status information of the MFP 101b itself (this is also referred to as proxy status information) to MFP 101a through normal communication through network 601 (S42).

When MFP 101a receives the proxy status information through communication unit 51, output control unit 25 stores the proxy status information into storage unit 23 (S43).

At MFP 101a, when visible light communication is performed later, output control unit 25 includes the proxy status information read from storage unit 23 into visible light communication information, in addition to its own status information. Output control unit 25 also includes the relative positional information into visible light communication information. Visible light output unit 90a outputs the relative positional information about MFP 101a, the status information of MFP 101a, and the proxy status information of MFP 101b, as visible light communication information, using light emitter 91a. At portable terminal 401, information acquisition unit 425 can acquire the status information of MFP 101a, the proxy status information of MFP 101b, and the relative positional information, based on the visible light communication information output from MFP 101a through visible light communication.

App 424 determines whether MFP 101a and MFP 101b, which has not performed visible light communication, fall within the image captured by camera 491, based on the acquired relative positional information. Then, if so, app 424 specifies the position of MFP 101b based on the position of MFP 101a identified based on the captured image result and the relative positional information. The status information of MFP 101b is then displayed, for example, as an air tag at a position in the image corresponding to MFP 101b. The status information of MFP 101a is also displayed, for example, as an air tag at a position in the image corresponding to MFP 101a.

FIG. 14 is a diagram showing an example of visible light communication information output in the second embodiment.

As shown in FIG. 14, in the second embodiment, the visible light communication information output when one of the two MFPs 101 is in the power saving mode includes the respective status information of the two MFPs 101. For example, in the case in FIG. 13, the visible light communication information output from MFP 101a includes the unique information of MFP 101a, the status information of MFP 101a, and the unique information and status information for MFP 101b in the power saving mode. Here, the unique information and status information for MFP 101b is the proxy status information sent from MFP 101b to MFP 101a. Information acquisition unit 425 of portable terminal 401 can acquire the status information and the proxy status information separately from each other from the visible light communication information.

The visible light communication information also includes the relative positional information (azimuth, distance, and the like) of MFP 101b to MFP 101a together with the status information for MFP 101b that is output simultaneously. This allows portable terminal 401 receiving the visible light communication information to specify the position of MFP 101b based on the position of MFP 101a.

Figure 15:
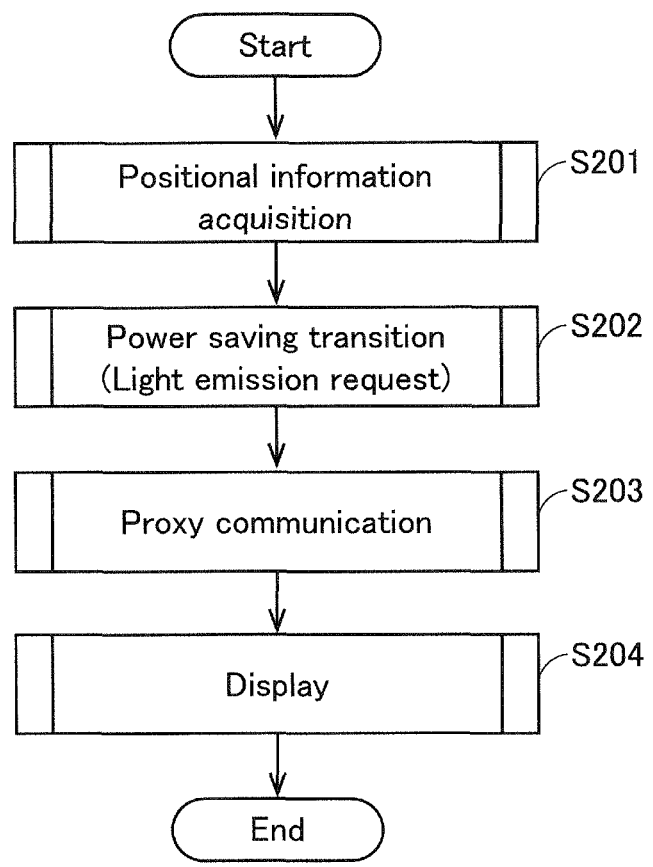
FIG. 15 is a flowchart showing an example of operation of the image forming system that is performed in the second embodiment.

FIG. 15 is a flowchart showing an example of operation of image forming system 901 that is performed in the second embodiment.

The operation as described above will be explained using flowcharts and timing charts. Referring to FIG. 15, in the second embodiment, the operation from a state in which two MFPs 101 are in the normal operation mode (a state in which visible light communication is performed) to when augmented reality display is performed with MFP 101b entering the power saving mode mainly includes four phases from step S201 to step S204, namely, a positional information acquisition phase (S201), a power saving transition/light emission request phase (S202), a proxy communication phase (S203), and a display phase (S204). Here, as for the display phase (S204), when both of two MFPs 101 are within the angle of view of camera 491, display for each of MFPs 101 is made, and the other operation is performed in the same manner as in the first embodiment. Therefore, a description is not given individually.

Figure 16:
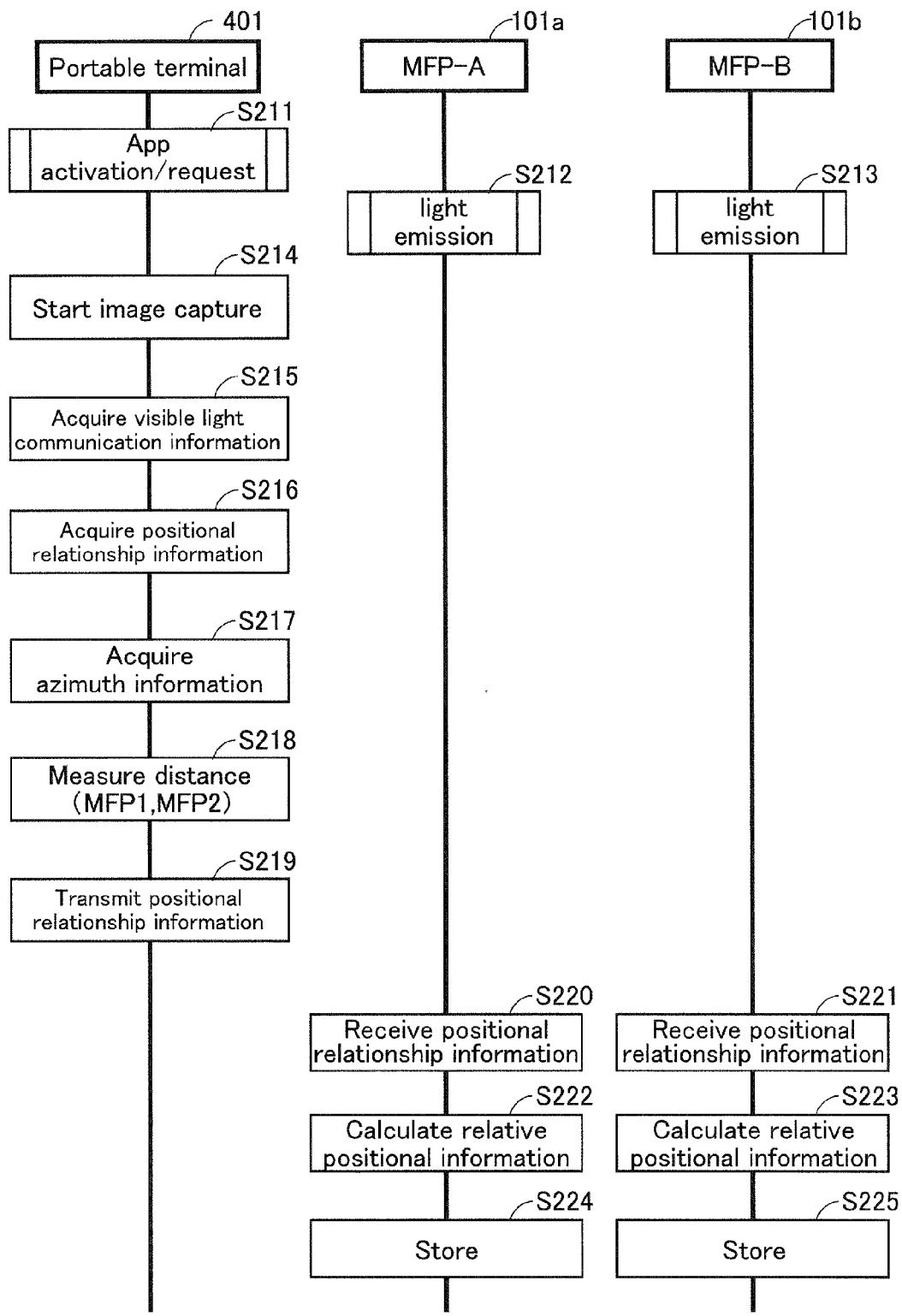
FIG. 16 is a diagram showing operation of a positional information acquisition phase.

FIG. 16 is a diagram showing operation of the positional information acquisition phase.

As shown in FIG. 16, in the positional information acquisition phase, operation is performed between portable terminal 401 and each of MFP 101a and MFP 101b. The positional information acquisition phase is performed when light emission by light emitters 91a, 91b is possible, for example, when the operation mode of both MFPs 101a and 101b is the normal operation mode, although not being limited thereto. For example, image forming system 901 may be allowed to operate in a predetermined initial setting mode until the relative positional information is stored in each MFP 101, and the operation of the positional information acquisition phase may be performed in the initial setting mode.

First, in step S211, at portable terminal 401, the app activation/request operation is performed in the same manner as in the first embodiment. In steps S212, S213, the light emission operation is performed in each of MFPs 101a, 101b in response. In step S214, portable terminal 401 starts image capturing with camera 491. In step S215, information acquisition unit 425 acquires visible light communication information. Here, MFPs 101a, 101b may always output visible light communication information without transmission of a light emission communication start request.

In step S217, information acquisition unit 425 acquires azimuth information for MFPs 101a, 101b. In step S218, information acquisition unit 425 measures the distance to each of MFPs 101a, 101b and acquires that information. Here, the user may point portable terminal 401 toward each of MFPs 101a, 101b, so that information acquisition unit 425 measures and acquires the azimuth and distance for each of MFPs 101a, 101b. When the positional relationship information is acquired in this manner, information acquisition unit 425 transmits the positional relationship information to MFPs 101a, 101b in step S219.

In steps S220, S221, MFP 101a, 101b receive the transmitted positional relationship information. In steps S222, S223, each of MFPs 101a, 101b calculates the relative positional information based on the positional relationship information. In steps S224, S225, output control unit 25 allows the calculated relative positional information to be stored into the corresponding control unit 23.

Figure 17:
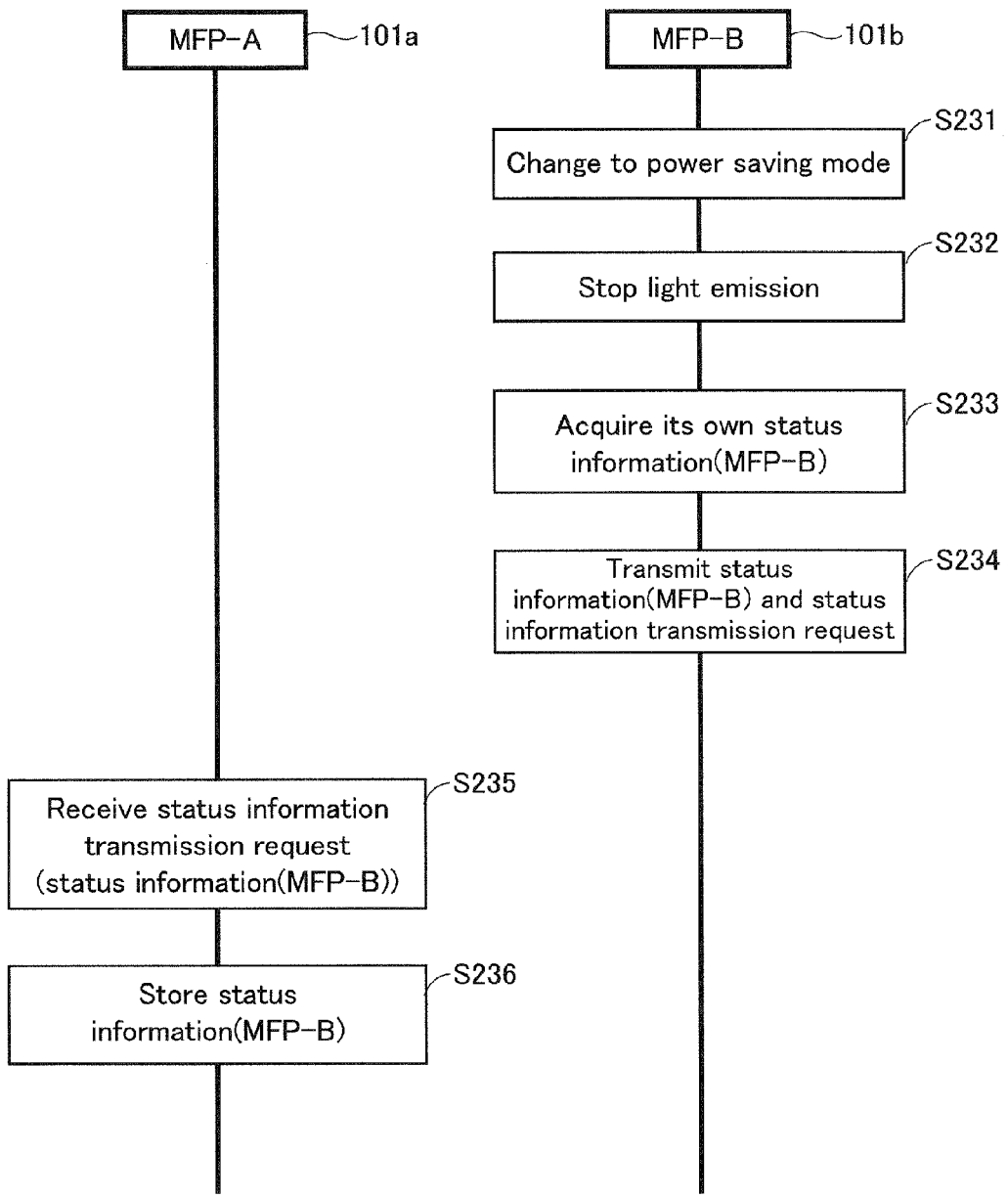
FIG. 17 is a diagram showing operation of a power saving transition/light emission request phase.

FIG. 17 is a diagram showing operation of the power saving transition/light emission request phase.

As shown in FIG. 17, in the power saving transition/light emission request phase, operation is performed between MFP 101a and MFP 101b. In step S231, the operation mode of MFP 101b changes to the power saving mode. In step S232, light emission from light emitter 91b of MFP 101b is stopped.

In step S233, output control unit 25 of MFP 101b acquires its own status information (status information of MFP 101b).

In step S234, output control unit 25 transmits information (proxy status information) about its own status information and a request to transmit that status information by proxy (status information transmission request) to MFP 101a through network 601.

In step S235, MFP 101a receives the proxy status information transmitted from MFP 101b.

In step S236, output control unit 25 of MFP 101a allows the proxy status information (status information of MFP 101b) to be stored into storage unit 23.

Figure 18:
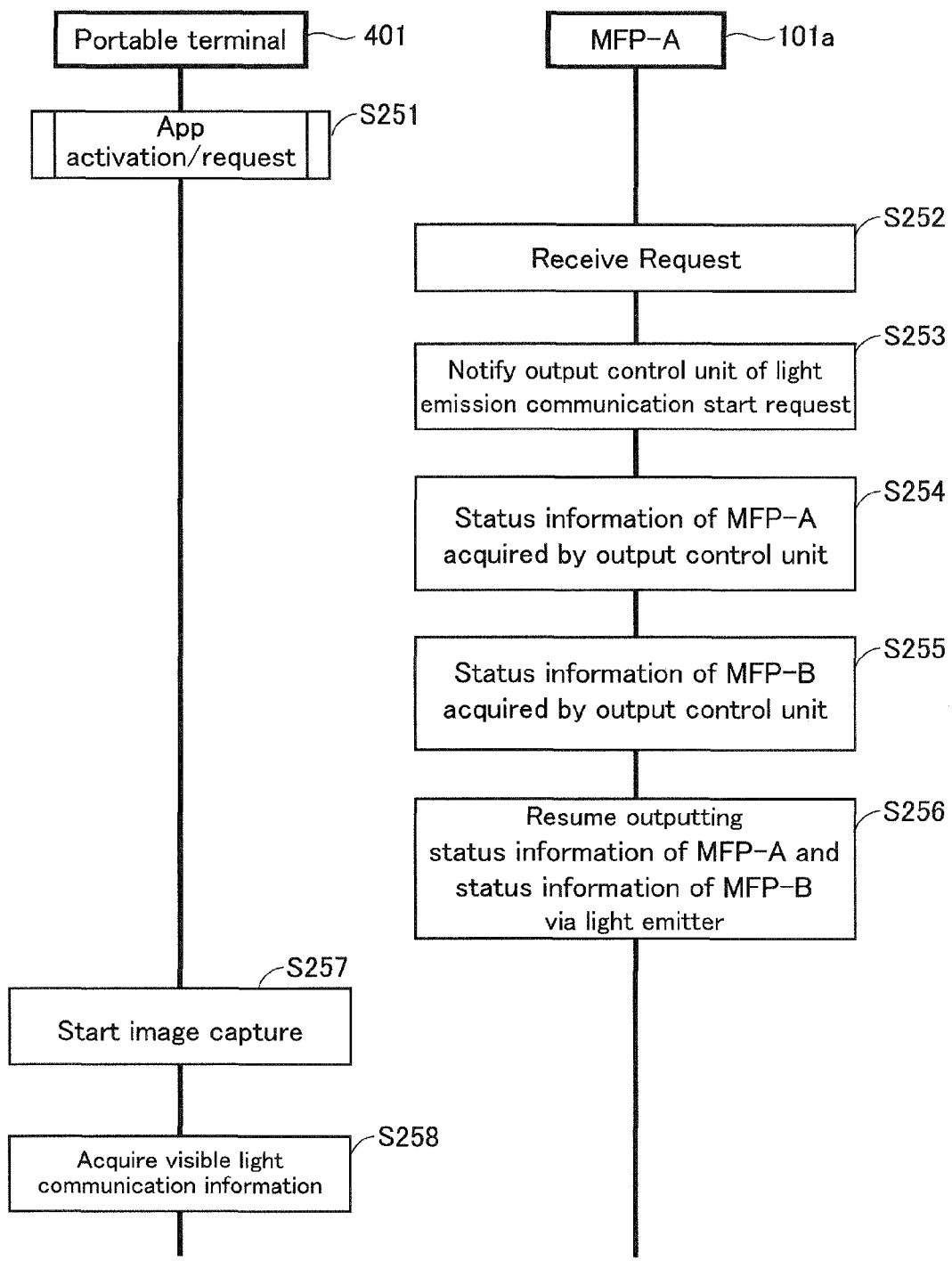
FIG. 18 is a diagram showing operation of a proxy communication phase.

FIG. 18 is a diagram showing operation of the proxy communication phase.

As shown in FIG. 18, in the proxy communication phase, operation is performed between portable terminal 401 and MFP 101a not in the power saving mode at that time. First, in step S251, at portable terminal 401, the app activation/request operation is performed in the same manner as in the foregoing first embodiment. In step S252, MFP 101a receives a light emission communication start request from portable terminal 401. In step S253, CPU 21 notifies output control unit 25 of the light emission communication start request. In the second embodiment, MFP 101a may always perform the process described below even without transmission/reception of the light emission communication start request.

In step S254, output control unit 25 acquires the status information of MFP 101a (its own status information).

In step S255, output control unit 25 acquires the status information of MFP 101b (the other device status information). The other device status information can be acquired, for example, from information stored in storage unit 23.

In step S256, output control unit 25 outputs its own status information and the other device status information through visible light communication. That is, visible light output unit 90a outputs visible light communication information including its own status information, the other device status information, and the like using light emitter 91a. Here, the visible light communication information also includes the relative positional information of MFP 101b to MFP 101a.

With the light emission operation in this manner, in step S257, at portable terminal 401, image capturing using camera 491 is started. When light emitter 91a of MFP 101a falls within the angle of view of the lens of camera 491, a signal of visible light communication output from light emitter 91a is received by camera 491. The information received through the received light is processed by information acquisition unit 425.

In step S258, information acquisition unit 425 acquires the visible light communication information based on the information obtained by receiving light from light emitter 91a with camera 491. The operation in the proxy communication phase thus ends.

As described above, according to the second embodiment, even when one of two MFPs 101 makes a transition to the power saving mode, the status information of each MFP 101 can be displayed as an air tag at the corresponding appropriate position. Therefore, the convenience of image forming system 901 can be enhanced while saving power in image forming system 901 is improved.

In the second embodiment, calculation of the relative positional information may be carried out at the portable terminal 401 side.

Figure 19:
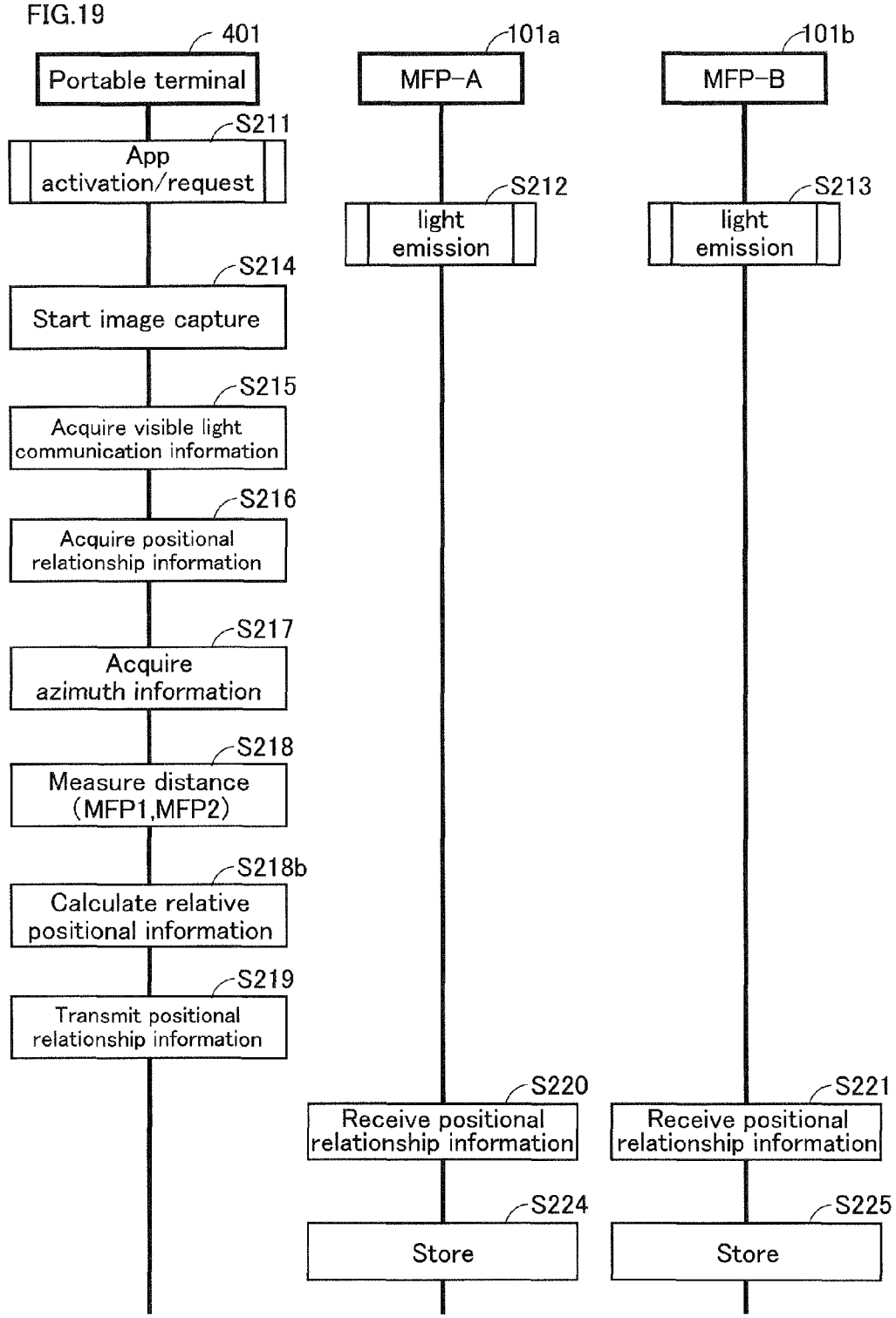
FIG. 19 is a diagram illustrating a modification of operation of the positional information acquisition phase according to the second embodiment.

FIG. 19 is a diagram illustrating a modification of operation of the positional information acquisition phase according to the second embodiment.

When FIG. 19 is compared with FIG. 16, the modification shown in FIG. 19 differs from FIG. 16 in that step S218b is provided and steps S222, S223 are not provided. In the present embodiment, in steps S217 and S218, when the positional relationship information concerning the azimuth and distance where MFPs 101a, 101b are located is obtained, app 424 calculates the relative positional information between MFP 101a and MFP 101b (information based on the positional relationship information) (step S28). In step S219, the calculated relative positional information is transmitted to each of MFPs 101a, 101b.

This configuration eliminates the need for each of MFPs 101a, 101b to calculate the relative positional information, thereby reducing the processing burden in MFPs 101a, 101b.

Third Embodiment

The basic configuration of image forming system 901 in a third embodiment is the same as that of the first embodiment, and a description thereof is therefore not repeated here. The operation of performing augmented reality display using portable terminal 401 when MFP 101 is in the normal operation mode is also the same as in the first embodiment.

Operation During MFP Power Saving Mode
Transition in Third Embodiment

In the third embodiment, operation is performed, for example, between portable terminal 401, MFP 101a, and server 701. For example, when MFP 101a makes a transition to the power saving mode, the status information of MFP 101a is stored from MFP 101a into storage unit 723 of server 701. MFP 101a operating in the power saving mode performs visible light communication with portable terminal 401. Here, access information to the status information of MFP 101a that is provided by server 701 is transmitted from MFP 101a to portable terminal 401. Portable terminal 401 acquires the status information of MFP 101a from the server based on the access information, whereby augmented reality display can be performed in portable terminal 401. This operation will be described below. In the following description, for the sake of brevity, MFP 101b and the like will not be mentioned. However, the same operation may be performed by MFP 101b in place of MFP 101a.

Figure 20:
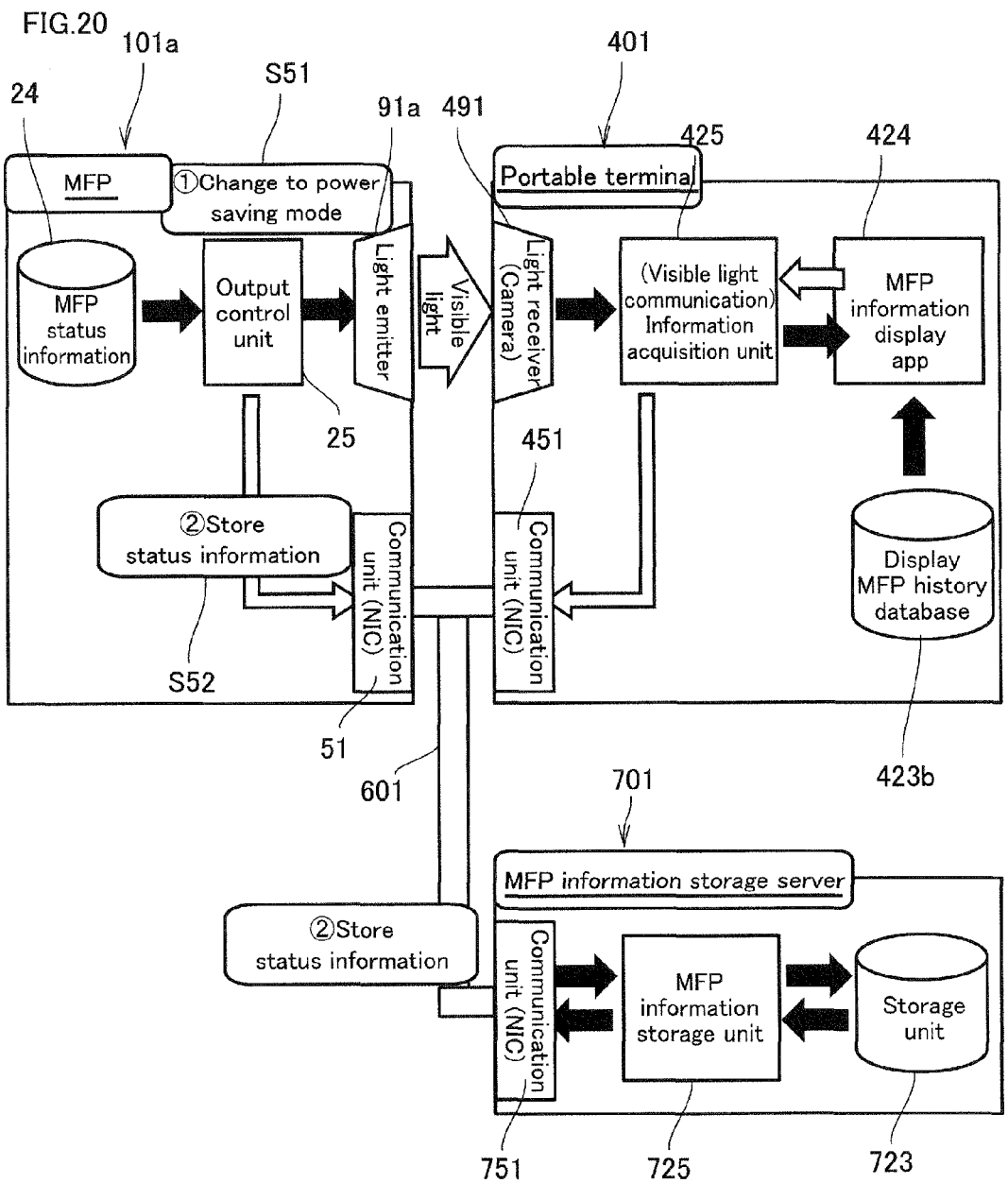
FIG. 20 and FIG. 21 are diagrams illustrating operation of the image forming system when the MFP makes a transition to the power saving mode in a third embodiment.

FIG. 20 is a first diagram illustrating operation of image forming system 901 when MFP 101a makes a transition to the power saving mode in the third embodiment.

As shown in FIG. 20, it is assumed that MFP 101a makes a transition to the power saving mode (S51). Here, at MFP 101a, output control unit 25 reads the status information of MFP 101a and transmits the same to server 701 (S52). Here, the status information is sent from communication unit 51 to communication unit 751 of server 701 through normal communication through network 601. At server 701, CPU 721 executes a predetermined control program to allow information storage unit 725 to function. Information storage unit 725 allows the received status information to be stored into storage unit 723.

Here, information storage unit 725 keeps the status information stored in storage unit 723 such that it can be provided to portable terminal 401. In other words, information storage unit 725 provides the status information such that portable terminal 401 can accesses storage unit 723 through network 601 to acquire the status information. Information storage unit 725 also transmits the access information required for portable terminal 401 to access the status information to MFP 101a. Here, portable terminal 401 can communicate with server 701, for example, in the HTTP protocol to download the status information. Here, as the access information, information of the URL (Uniform Resource Locator) indicating the location of the status information is transmitted from information storage unit 725 to MFP 101a. MFP 101a receives the URL information and gives a notice to output control unit 25.

Receiving the URL information as described above, output control unit 25 outputs this URL information as visible light communication information in visible light communication to be performed subsequently. That is, visible light output unit 90a outputs the URL information transmitted from server 701 through visible light communication using light emitter 91a.

Figure 21:
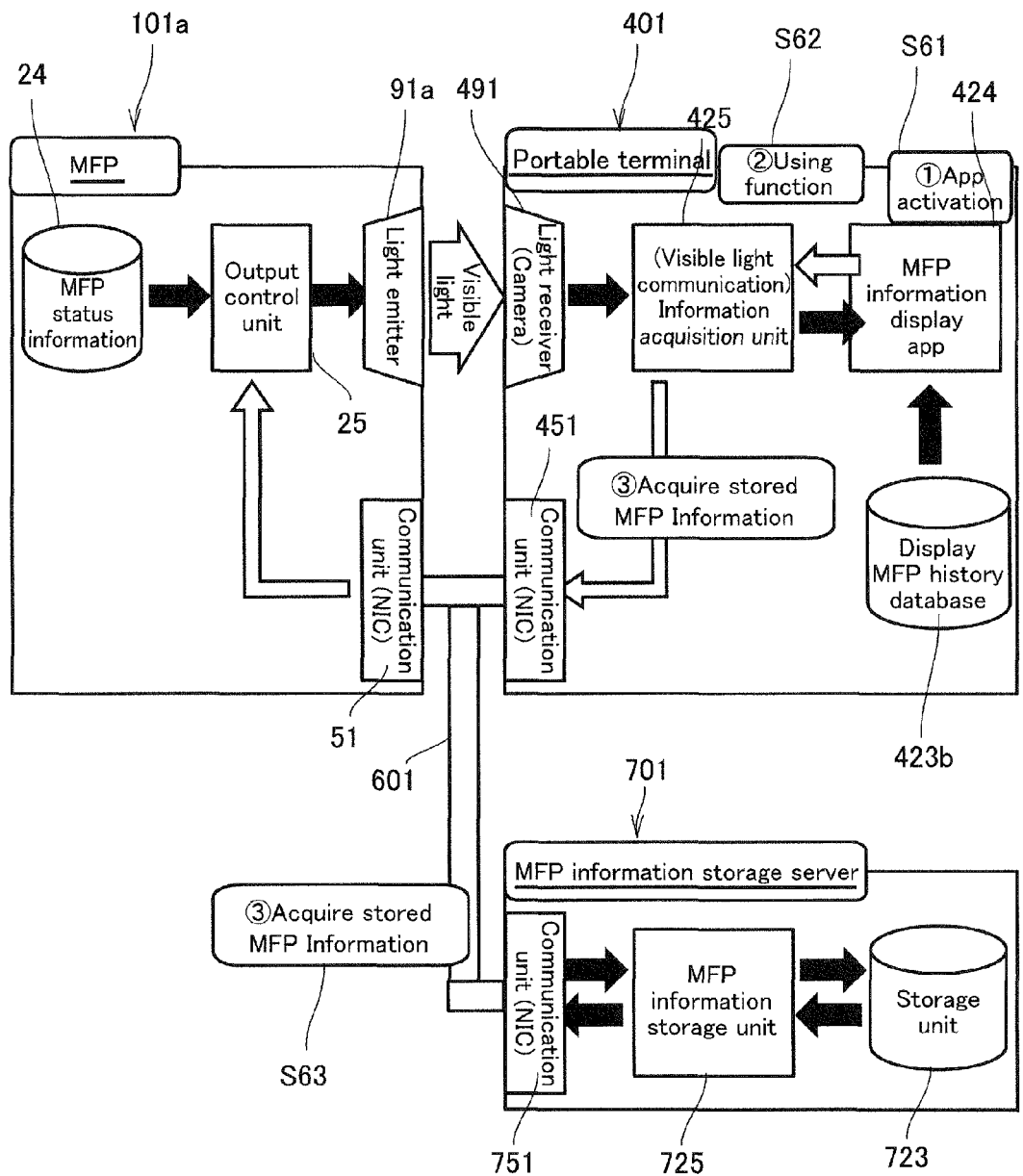

FIG. 21 is a second diagram illustrating operation of image forming system 901 when MFP 101a makes a transition to the power saving mode in the third embodiment.

As shown in FIG. 21, it is assumed that predetermined app 424 for augmented reality display is activated at portable terminal 401 in the state in which MFP 101a makes a transition to the power saving mode and the status information is stored in server 701 as described above (S61). When app 424 is activated, the use of information acquisition unit 425 is requested (S62). App 424 starts image capturing with camera 491. Information acquisition unit 425 acquires visible light communication information based on the information acquired by camera 491.

Information acquisition unit 425 then accesses server 701 based on the URL information included in the acquired visible light communication information (S63).

Information acquisition unit 425 then downloads the status information provided by server 701. This allows app 424 to perform augmented reality display using the downloaded status information of MFP 101a.

FIG. 22 is a diagram showing an example of visible light communication information output in the third embodiment.

As shown in FIG. 22, in the third embodiment, the visible light communication information output from MFP 101a simply includes information indicating a state of the power source of MFP 101a (for example, during sleep (during operation in the power saving mode) or during normal operation) and the URL information indicating the location where any other status information is stored. Information acquisition unit 425 can acquire the status information by accessing the location indicated by this URL information.

Figure 23:
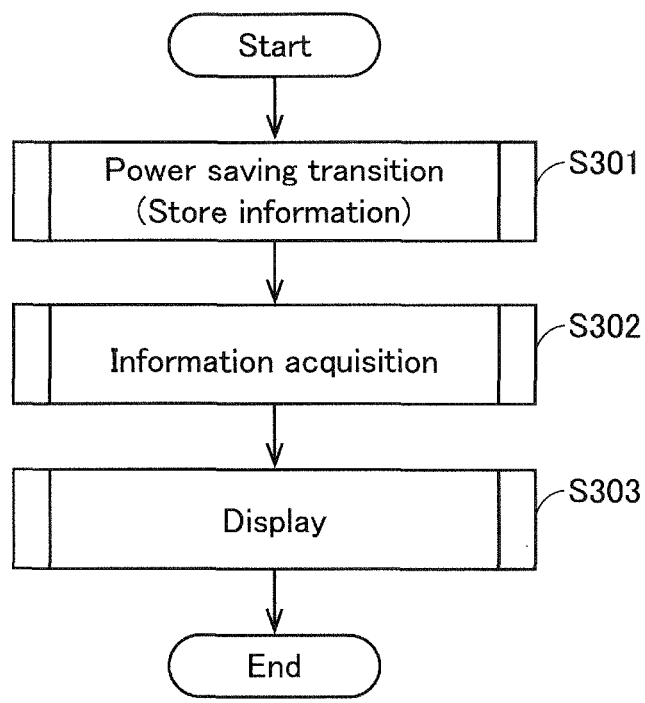
FIG. 23 is a flowchart showing an example of operation of the image forming system that is performed in the third embodiment.

FIG. 23 is a flowchart showing an example of operation of image forming system 901 that is performed in the third embodiment.

The operation as described above will be explained using flowcharts and timing charts. Referring to FIG. 23, in the third embodiment, the operation from when MFP 101a enters the power saving mode to when augmented reality display is performed mainly includes three phases from step S301 to step S303, namely, a power saving transition/information storage phase (S301), an information acquisition phase (S302), and a display phase (S303). Here, as for the display phase (S303), operation is performed in the same manner as in the foregoing first embodiment, and a description thereof is not given here.

Figure 24:
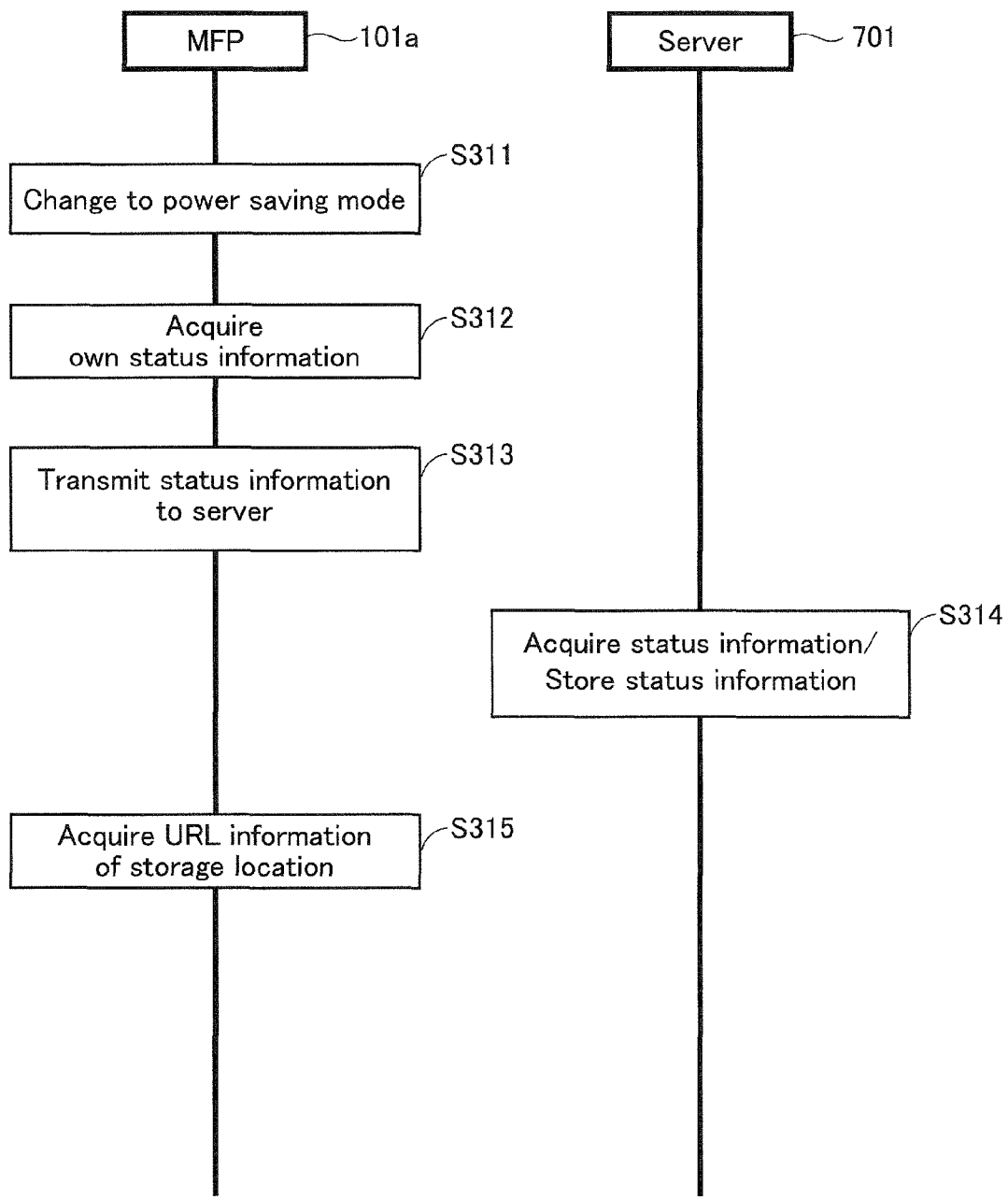
FIG. 24 is a diagram showing operation of a power saving transition/information storage phase.

FIG. 24 is a diagram showing operation of the power saving transition/information storage phase.

As shown in FIG. 24, in the power saving transition/information storage phase, operation is performed between MFP 101a and server 701.

In step S311, the operation mode of MFP 101a changes to the power saving mode. In step S312, output control unit 25 acquires the status information of the MFP 101a itself. In step S313, output control unit 25 transmits the acquired status information to server 701.

In step S314, information storage unit 725 of server 701 acquires the status information transmitted from MFP 101a and allows the acquired status information to be stored in storage unit 723. Information storage unit 725 transmits the URL information of the storage location to MFP 101a.

In step S315, output control unit 25 acquires the URL information of the storage location of the status information that is received by MFP 101a. Output control unit 25 allows the URL information to be stored in storage unit 23.

Figure 25:
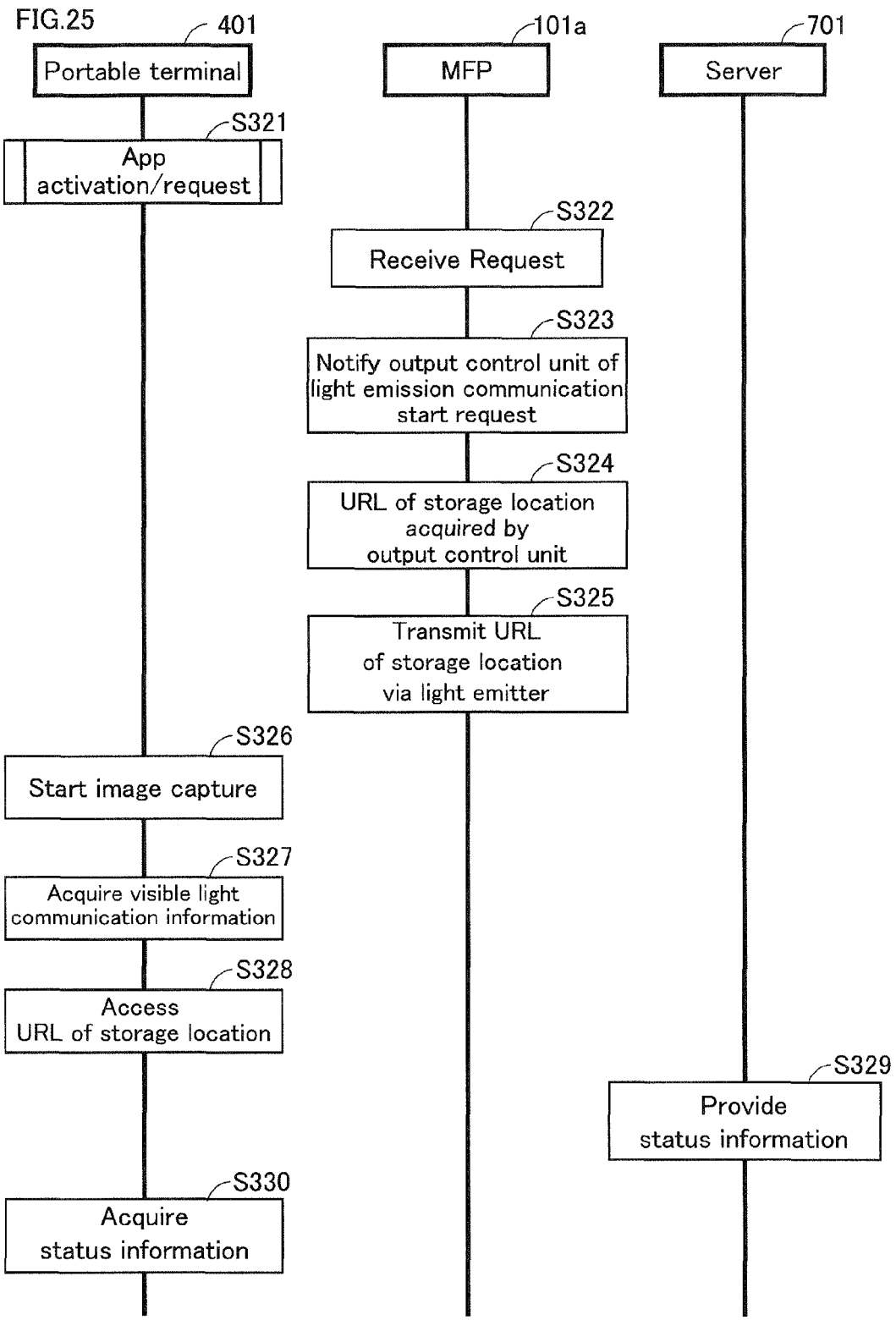
FIG. 25 is a diagram showing operation of an information acquisition phase.

FIG. 25 is a diagram showing the information acquisition phase.

As shown in FIG. 25, in the information acquisition phase, operation is performed between portable terminal 401, MFP 101a, and server 701.

In step S321, the app activation/request operation is performed at portable terminal 401 in the same manner as in the first embodiment. A light emission communication start request is transmitted, and, in step S322, MFP 101a receives the light emission communication start request. In step S323, output control unit 25 is notified of the light emission communication start request.

In step S324, output control unit 25 reads and acquires the URL information stored in the power saving transition/information storage phase.

In step S325, visible light output unit 90a outputs the URL information included in the visible light communication information, using light emitter 91a under the control of output control unit 25.

In step S326, at portable terminal 401, image capturing using camera 491 is started. In step S327, information acquisition unit 425 acquires the visible light communication information based on the information obtained by receiving light with camera 491. Information acquisition unit 425 acquires the URL information based on the visible light communication information.

In step S328, information acquisition unit 425 accesses server 701 through normal communication through network 601, based on the acquired URL information.

In step S329, information storage unit 725 of server 701 provides the stored status information to the accessing portable terminal 401.

In step S330, information acquisition unit 425 downloads and acquires the status information provided by server 701.

As described above, in the third embodiment, when MFP 101a makes a transition to the power saving mode, the status information is stored into server 701, and MFP 101a merely outputs the URL information through visible light communication. Accordingly, the volume of communication is reduced in the visible light communication performed when MFP 101a is in the power saving mode, when compared with the case where the status information is directly output. Therefore, the time during which light emitter 91a is turned on can be reduced. Therefore, power consumed by MFP 101a for performing visible light commination is reduced.

[Others]

The image forming system may be configured by appropriately combining various elements in the configurations in the foregoing first to third embodiments.

In the third embodiment, the server may be an MFP. In this case, the server function fulfilled by the MFP may perform the function of providing status information.

In the second embodiment, MFP-A may be replaced by another information processing apparatus, and the information processing apparatus may output the proxy status information of the MFP entering the power saving mode, by proxy, through visible light communication. In this case, the information processing apparatus may be configured to have an illumination (light emitter) and perform visible light communication by controlling the illumination. For example, an example of the information processing apparatus includes a room illumination system (for example, the one having a function of controlling turning on/off of a light source such as a fluorescent lamp and an LED lamp) that turns on/off illumination in accordance with information transmitted from the outside. The information processing apparatus may or may not output the status information of the information processing apparatus itself when the information processing apparatus outputs proxy status information through visible light communication.

The number of MFPs included in the image forming system is not limited to two and may be more than two. In the first and third embodiments, the number of MFPs may be one.

The image forming device may be any of a black-and-white or color copier, printer, facsimile machine, or a multi-function peripheral (MFP) as a combination thereof. A hardware configuration of each device is not restricted to that described above.

The processes according to the above embodiments may be performed by software or by using a hardware circuit.

A program for executing the processes according to the above embodiments may be provided as well. The program may be recorded on a recording medium, such as a CD-ROM, flexible disk, hard disk, ROM, RAM, memory card, or the like, so as to be provided to the user. The program may also be downloaded to the device via a communication line such as the Internet. The processes described in conjunction with the flowcharts above are executed by a CPU and the like in accordance with the program.

The foregoing embodiments can provide an image forming system with low power consumption and with high convenience.

It should be understood that the embodiments described above are illustrative and non-restrictive in every respect. The scope of the present invention is defined by the terms of the claims, rather than the description above, and is intended to include any modifications within the scope and meaning equivalent to the terms of the claims.

What is claimed is:

1. An image forming system comprising an image forming apparatus having a light emitter and an information terminal,
the image forming apparatus including:
a visible light output unit outputting information stored in the image forming apparatus by emitting visible light from the light emitter, and
an output control unit controlling operation of the visible light output unit,
the information terminal including:
a light receiver receiving the visible light emitted from the light emitter of the image forming apparatus, and
an information acquisition unit acquiring information stored in the image forming apparatus based on information obtained by receiving visible light with the light receiver, wherein
when the information acquisition unit is operative in the information terminal, the information acquisition unit of the information terminal gives a light emission start request to the output control unit of the image forming apparatus, and
when the light emission start request is received from the information acquisition unit, and the image forming apparatus is in a power saving mode wherein the visible light output unit is not outputting information using the light emitter, the output control unit of the image forming apparatus controls operation of the visible light output unit to output the information stored in the image forming apparatus by emitting visible light from the light emitter.

2. The image forming system according to claim 1, wherein the light receiver is a camera, and
the information acquisition unit acquires visible light communication information emitted from an output side, from image information captured by the light receiver.

3. The image forming system according to claim 1, wherein when giving the light emission start request, the information acquisition unit broadcasts the light emission start request to all of the image forming apparatuses that can communicate with the information terminal.

4. The image forming system according to claim 1, wherein when the information acquisition unit gives the light emission start request, the information acquisition unit stores an image forming apparatus to which the light emission start request is given, and gives a next light emission start request only to the stored image forming apparatus.

5. The image forming system according to claim 1, wherein the image forming apparatus is capable of receiving the light emission start request only when the image forming apparatus is operating in a power saving mode.

6. The image forming system according to claim 1, wherein the image forming apparatus stops emission by the light emitter when the image forming apparatus shifts to a power saving mode, and the image forming apparatus starts emission by the light emitter with the power saving mode maintained if the image forming apparatus receives the light emission start request when the image forming apparatus is operating in a power saving mode.

7. The image forming system according to claim 1, wherein the information terminal acquires an operating state of the image forming apparatus, and
the information terminal outputs the light emission start request to the image forming apparatus when the received operating state indicates that the image forming apparatus is in the power saving mode.

8. The image forming system according to claim 1, wherein the information terminal outputs the light emission start request to the image forming apparatus when the information terminal detects that no visible light is emitted from the light emitter of the image forming apparatus.

9. The image forming system according to claim 1, wherein the information acquisition unit is allowed to function when a predetermined application is activated at the information terminal, and
the output control unit gives the light emission start request in accordance with a timing when the predetermined application is activated at the information terminal.

10. The image forming system according to claim 9, wherein the predetermined application is an application for performing augmented reality display in the information terminal.

11. The image forming system according to claim 10, wherein the image forming apparatus outputs a status information of the image forming apparatus by emitting the visible light from the light emitter,
the information terminal including a camera,
when the light receiver receives the status information from the image information apparatus by receiving the visible light emitted from the image forming apparatus, the information terminal displays the status information by overlaying the status information to an image captured by the camera.

12. An image forming system comprising:
an image forming apparatus having a light emitter;
an information terminal; and
an information processing apparatus performing communication with each of the information terminal and the image forming apparatus,
the image forming apparatus including:
a device-to-device transmission unit transmitting device information about the image forming apparatus itself to the information processing apparatus, and a visible light output unit acquiring access information transmitted from the information processing apparatus and outputting the acquired access information to the information terminal by emitting visible light from the light emitter, the information processing apparatus including:

a storage unit storing the device information transmitted by the device-to-device transmission unit, a provision unit providing the device information stored in the storage unit such that the information terminal can acquire the device information, and an access information transmission unit transmitting the access information required for the information terminal to access the device information provided by the provision unit, to the image forming apparatus, the information terminal including:

a light receiver receiving the visible light emitted from the light emitter of the image forming apparatus, an information acquisition unit acquiring visible light communication information based on information obtained by receiving visible light with the light receiver, a device information acquisition unit accessing the device information in accordance with the access information to acquire the device information, when the access information output from the visible light output unit is acquired by the information acquisition unit, and a display unit performing display based on the device information acquired by the device information acquisition unit.

13. The image forming system according to claim 12, wherein
the light receiver is a camera, and
the information acquisition unit acquires the visible light communication information from image information captured by the light receiver.

14. The image forming system according to claim 12, wherein the device-to-device transmission unit of the image forming apparatus outputs a status information of the image forming apparatus to the information terminal in accordance with a shift of the image forming apparatus to a power saving mode.

15. The image forming system according to claim 12, wherein the image forming apparatus stops emission by the light emitter when the image forming apparatus shifts to a power saving mode, and the image forming apparatus resumes emission by the light emitter when the image forming apparatus receives the light emission start request.

16. An image forming system comprising:
an information processing apparatus and an image forming apparatus, each having a light emitter; and
an information terminal,
the image forming apparatus including:
a device-to-device transmission unit transmitting device information about the image forming apparatus itself to the information processing apparatus,
the information terminal including:
a camera,
an information acquisition unit acquiring visible light communication information from image information captured by the camera,
a display unit performing display based on the visible light communication information acquired by the information acquisition unit,
an azimuth sensing unit sensing an azimuth at which the information terminal faces, and
a positional relationship transmission unit acquiring positional relationship information about a positional relationship between the information processing apparatus and the image forming apparatus using the azimuth sensing unit, if the information processing apparatus and the image forming apparatus are included in the image captured by the camera, and transmitting the positional relationship information or information based on the positional relationship information to at least the information processing apparatus, the information processing apparatus including:

a position acquisition unit acquiring relative positional information between the information processing apparatus and the image forming apparatus, based on the information transmitted from the positional relationship transmission unit, and a visible light output unit outputting information to the information terminal by emitting visible light from the light emitter, wherein when the information terminal is capturing an image with the camera, the visible light output unit outputs the relative positional information acquired by the position acquisition unit and the device information transmitted from the image forming apparatus as the visible light communication information to the information terminal, and the display unit determines whether the image forming apparatus is included in the image captured by the camera, based on the relative positional information output from the visible light output unit, and, if the image forming apparatus is included in the image, displays the device information based on the relative positional information.

17. The image forming system according to claim 16, wherein
the positional relationship information includes
azimuth information sensed by the azimuth sensing unit,
first distance information obtained by calculating a distance from the information terminal to the information processing apparatus,
second distance information obtained by calculating a distance from the information terminal to the image forming apparatus, and
unique information of the corresponding apparatus obtained by the information acquisition unit from each of the information processing apparatus and the image forming apparatus.

18. The image forming system according to claim 16, wherein
the positional relationship transmission unit transmits the positional relationship information to at least the information processing apparatus, and
the position acquisition unit calculates and acquires the relative positional information based on the positional relationship information transmitted from the information terminal.

19. The image forming system according to claim 16, wherein
the positional relationship transmission unit calculates relative positional information indicating a positional relationship between the information processing apparatus and the image forming apparatus, based on the acquired positional relationship information, and transmits the relative positional information to at least the information processing apparatus, and
the position acquisition unit acquires the relative positional information transmitted from the information terminal.

20. The image forming system according to claim 16, wherein
the information processing apparatus is a second image forming apparatus different from the image forming apparatus,
when outputting the visible light communication information, the visible light output unit further outputs device information about the information processing apparatus to the information terminal, and
when both of the information processing apparatus and the image forming apparatus are included in the image, the display unit displays, for each of the apparatuses, device information of the corresponding apparatus that is output from the visible light output unit, based on the relative positional information.

21. The image forming system according to claim 16, wherein
the information acquisition unit separates device information of the information processing apparatus and device information of the image forming apparatus that are included in the visible light communication information, and
when the information processing apparatus and the image forming apparatus are included in an image captured by the camera, the display unit displays the image by placing the device information of the information processing apparatus at a position in the image corresponding to the information processing apparatus and placing the device information of the image forming apparatus at a position in the image corresponding to the image forming apparatus.

22. The image forming system according to claim 16, wherein the device-to-device transmission unit transmits the device information to the information processing apparatus when an operation mode of the image forming apparatus changes from a normal operation mode to a power saving mode in which operation of a predetermined unit of the apparatus is stopped.

23. The image forming system according to claim 16, wherein
when the information acquisition unit is operative in the information terminal, the information acquisition unit gives a light emission start request to the output control unit by communicating with the image forming apparatus, and
when the light emission start request is received from the information acquisition unit and the visible light output unit is not outputting of information using the light emitter, the output control unit allows execution of output of information using the light emitter by controlling operation of the visible light output unit so that emitting by the light emitter starts.

24. The image forming system according to claim 16, wherein the device-to-device transmission unit of the image forming apparatus outputs a status information of the image forming apparatus to the information terminal in accordance with a shift of the image forming apparatus to a power saving mode.

25. The image forming system according to claim 16, wherein the image forming apparatus stops emission by the light emitter when the image forming apparatus shifts to a power saving mode, and the image forming apparatus resumes emission by the light emitter when the image forming apparatus receives the light emission start request.

26. An information terminal, comprising:
a camera receiving visible light emitted from a light emitter of an image forming apparatus;
an information acquisition unit acquiring information stored in the image forming apparatus and outputted from the light emitter of the image forming apparatus from image information captured and obtained by receiving the visible light by the camera;
a request transmission unit transmitting a light emission start request to the image forming apparatus by communicating with the image forming apparatus, when the information acquisition unit is operative in the information terminal; and
an image capturing control unit capturing an image with the camera when the request transmission unit transmits the light emission start request, wherein
when the light emission start request is transmitted to the image forming apparatus, and the image forming apparatus is in a power saving mode wherein the light emitter of the image forming apparatus is not outputting information, the light emission start request causes the image forming apparatus to emit visible light from the light emitter.

27. The information terminal according to claim 26, further comprising a display unit performing display based on the visible light communication information acquired by the information acquisition unit, wherein
the display unit determines whether the image forming apparatus is included in an image captured by the camera, based on the visible light communication information acquired by the information acquisition unit, and, if the image forming apparatus is included in the image, displays information about the image forming apparatus together with the image based on the visible light communication information.

28. The information terminal according to claim 26, further comprising an azimuth sensing unit sensing an azimuth at which the information terminal faces when performing visible light communication with the image forming apparatus, wherein
when the image forming apparatus and an information processing apparatus that can communicate with the image forming apparatus are included in an image captured by the camera, positional relationship information about a positional relationship between the information processing apparatus and the image forming apparatus is acquired using the azimuth sensing unit, and
the acquired positional relationship information or information based on the positional relationship information is transmitted to at least the image forming apparatus.

29. An image forming apparatus having a light emitter, comprising:
a visible light output unit outputting information stored in the image forming apparatus by emitting visible light from the light emitter;
a request receiving unit receiving a light emission start request from an information terminal; and
an output control unit allowing the visible light output unit to execute output of information using the light emitter by controlling operation of the visible light output unit so that emitting by the light emitter starts when the light emission start request is received by the request receiving unit and the image forming apparatus is in a power saving mode wherein the visible light output unit is not outputting of information using the light emitter.

30. A method of controlling an information terminal, the information terminal including:
a camera receiving visible light emitted from a light emitter of an image forming apparatus, and an information acquisition unit acquiring information stored in the image forming apparatus outputted from the light emitter of the image forming apparatus from image information captured and obtained by receiving the visible light by the camera, the method comprising:

transmitting a light emission start request to the image forming apparatus by communicating with the image forming apparatus when the information acquisition unit is operative in the information terminal, and the image forming apparatus is in a power saving mode wherein the light emitter of the image forming apparatus is not outputting visible light; and capturing an image with the camera when the light emission start request is transmitted.

31. A non-transitory computer-readable recording medium encoded with a control program for an information terminal that allows a computer to execute the method of controlling an information terminal according to claim 30.

32. A method of controlling an image forming apparatus having a light emitter, the image forming apparatus including a visible light output unit outputting information stored in the image forming apparatus by emitting visible light from the light emitter, the method comprising:

receiving a light emission start request from an information terminal; and allowing the visible light output unit to execute output of information using the light emitter by controlling operation of the visible light output unit so that emitting by the light emitter starts when the light emission start request is received and the image forming apparatus is in a power saving mode wherein the visible light output unit is not outputting information using the light emitter.

33. A non-transitory computer-readable recording medium encoded with a control program for an information terminal that allows a computer to execute the method of controlling an image forming apparatus according to claim 32.

* * * * *